(12) United States Patent
Zimmerman

(10) Patent No.: US 11,846,389 B2
(45) Date of Patent: *Dec. 19, 2023

(54) QUICK-RELEASE ANCHORING APPARATUS WITH SELF-MOUNTED ANCHOR MEMBER

(71) Applicant: Israel Harry Zimmerman, Los Angeles, CA (US)

(72) Inventor: Israel Harry Zimmerman, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/809,454

(22) Filed: Jun. 28, 2022

(65) Prior Publication Data

US 2022/0403977 A1    Dec. 22, 2022

Related U.S. Application Data

(63) Continuation of application No. 17/137,710, filed on Dec. 30, 2020, now Pat. No. 11,415,266.

(51) Int. Cl.
| | |
|---|---|
| *F16M 13/00* | (2006.01) |
| *F16M 13/02* | (2006.01) |
| *F16B 47/00* | (2006.01) |

(52) U.S. Cl.
CPC .......... *F16M 13/022* (2013.01); *F16B 47/00* (2013.01)

(58) Field of Classification Search
CPC ..... F16M 13/022; F16M 11/041; F16B 47/00; A47G 23/0225
See application file for complete search history.

(56) References Cited

U.S. PATENT DOCUMENTS

| | | |
|---|---|---|
| 1,518,943 A | 12/1924 | Story |
| 1,753,611 A | 4/1930 | Lower |
| (Continued) | | |

FOREIGN PATENT DOCUMENTS

| | | |
|---|---|---|
| CN | 1079886 A1 | 12/1993 |
| CN | 203987324 U | 12/2014 |
| (Continued) | | |

OTHER PUBLICATIONS

KIPO, PCT International Search Report, PCT International Application No. PCT/2022/070018 entitled "Quick-Release Anchoring Apparatus With Self-Mounted Anchor Member", Sep. 21, 2022, 3 pages.

(Continued)

*Primary Examiner* — Amy J. Sterling
(74) *Attorney, Agent, or Firm* — Walter W. Duft

(57) ABSTRACT

A quick-release anchoring apparatus includes an anchor member having a flexible base seal member that engages an external reference surface and forms a substantially airtight seal therewith to define a controlled pressure zone. The anchor member includes a central stem extending through an opening of a first auxiliary component. The anchor member is rigidly self-mounted to the first auxiliary component without discrete retainers or fasteners. A vent port extends through the anchor member. A vent port upper end is centered within a stem landing zone on the stem upper end. A second auxiliary component is slidably mounted to the first auxiliary component for guided movement between a vent port closure position wherein the second auxiliary component engages the stem landing zone and blocks the vent port, a vent port open position wherein the second auxiliary component is out of engagement with the stem landing zone and unblocks the vent port.

20 Claims, 19 Drawing Sheets

(56) References Cited

U.S. PATENT DOCUMENTS

| | | |
|---|---|---|
| 1,778,175 A | 10/1930 | Thune |
| 1,840,400 A | 1/1932 | Lebherz |
| 2,083,299 A | 6/1937 | Hunter |
| 2,233,870 A | 3/1941 | Muter |
| 2,319,726 A | 5/1943 | Duggan |
| 2,319,727 A | 5/1943 | Duggan |
| 2,542,400 A | 3/1948 | Donofrio |
| 2,565,793 A | 8/1951 | Weismantel |
| 2,601,279 A | 6/1952 | Hacus |
| 2,740,545 A | 9/1956 | Bates |
| 2,782,948 A | 2/1957 | Steinberg |
| 2,839,260 A | 6/1958 | Jacobi, Jr. |
| 2,895,636 A | 7/1959 | Martin |
| 2,908,473 A | 10/1959 | Snyder |
| 2,910,264 A | 10/1959 | Lindenberger |
| 2,932,119 A | 4/1960 | Borah |
| 2,936,139 A | 5/1960 | Lindstrom |
| 2,963,256 A | 12/1960 | Borah |
| 2,968,888 A | 1/1961 | Borah |
| 3,094,235 A | 6/1963 | Lunning |
| 3,159,370 A | 12/1964 | Rubinstein |
| 3,383,001 A | 5/1968 | Wei |
| 3,675,886 A | 7/1972 | Kampmier |
| 3,847,324 A | 11/1974 | Uchanski et al. |
| 4,040,549 A | 8/1977 | Sadler |
| 4,127,211 A | 11/1978 | Zerbey |
| 4,133,575 A | 1/1979 | Mader |
| 4,137,356 A | 1/1979 | Shoemaker et al. |
| 4,593,947 A | 6/1986 | Yokum |
| 4,726,553 A | 2/1988 | Wischusen, III |
| 4,756,497 A | 7/1988 | Lan |
| 4,759,525 A | 7/1988 | Cross et al. |
| 4,760,987 A | 8/1988 | Lan |
| 4,836,488 A | 6/1989 | Ross |
| 4,872,721 A | 10/1989 | Sniadach |
| 4,890,760 A | 1/1990 | Nicoll, Sr. et al. |
| 4,928,848 A | 5/1990 | Ballway |
| 4,940,138 A | 7/1990 | Hornstein |
| 4,941,635 A | 7/1990 | Lan |
| 4,955,493 A | 9/1990 | Touzani |
| 4,978,566 A | 12/1990 | Scheurer et al. |
| 5,040,719 A | 8/1991 | Ballway |
| 5,065,973 A | 11/1991 | Wang |
| 5,071,096 A | 12/1991 | Hartman et al. |
| 5,076,527 A | 12/1991 | Yung-Huei |
| 5,133,524 A | 7/1992 | Liu |
| 5,180,132 A | 1/1993 | Pearson et al. |
| 5,186,350 A | 2/1993 | McBride |
| 5,190,332 A | 3/1993 | Nagai |
| 5,192,043 A | 3/1993 | Fa |
| 5,207,076 A | 5/1993 | Sciarrillo |
| 5,213,385 A | 5/1993 | Nagai |
| 5,263,760 A | 11/1993 | Sohol |
| 5,273,182 A | 12/1993 | Laybourne |
| 5,282,541 A | 2/1994 | Chen |
| 5,292,140 A | 3/1994 | Laing |
| 5,381,990 A | 1/1995 | Belokin |
| D357,170 S | 4/1995 | Wellsfry |
| 5,413,302 A | 5/1995 | Ferster |
| 5,511,752 A | 4/1996 | Trethewey |
| 5,531,353 A | 7/1996 | Ward et al. |
| 5,651,520 A | 7/1997 | Belokin et al. |
| 5,667,180 A | 9/1997 | Duckworth |
| 5,742,971 A | 4/1998 | Salinger |
| D397,915 S | 9/1998 | McNaughton |
| D400,763 S | 11/1998 | Taylor et al. |
| 5,992,806 A | 11/1999 | Adams |
| 6,000,575 A | 12/1999 | LaCour et al. |
| 6,039,206 A | 3/2000 | DeFrancesco |
| 6,059,138 A | 5/2000 | Labruyere |
| D439,116 S | 3/2001 | White |
| 6,264,054 B1 | 7/2001 | Miyake et al. |
| 6,315,153 B1 | 11/2001 | Osborn |
| 6,318,683 B1 | 11/2001 | Savoy |
| 6,367,652 B1 | 4/2002 | Toida et al. |
| 6,439,418 B1 | 8/2002 | Immerman et al. |
| 6,491,265 B2 | 12/2002 | Tracy |
| 6,497,394 B1 | 12/2002 | Dunchock |
| 6,511,031 B2 | 1/2003 | Lin |
| 6,520,368 B1 | 2/2003 | Chiu |
| 6,543,637 B1 | 4/2003 | Osborn |
| 6,571,976 B1 | 6/2003 | Sonnabend |
| 6,596,374 B1 | 7/2003 | Adjeleian |
| 6,648,285 B1 | 11/2003 | Woollen |
| 6,666,420 B1 | 12/2003 | Carnevali |
| 6,745,987 B2 | 6/2004 | Rousselet et al. |
| 6,749,160 B1 | 6/2004 | Richter |
| 6,776,368 B1 | 8/2004 | Duncan et al. |
| 6,895,642 B2 | 5/2005 | Huang |
| 7,090,183 B2 | 8/2006 | Heybl et al. |
| 7,178,771 B2 | 2/2007 | Richter |
| 7,201,285 B2 | 4/2007 | Beggins |
| 7,306,113 B2 | 12/2007 | El-Saden et al. |
| 7,344,114 B2 | 3/2008 | Richter |
| 7,458,541 B1 | 12/2008 | Chang |
| 7,481,329 B2 | 1/2009 | Camp, Jr. |
| 7,726,715 B2 | 6/2010 | Nagasawa et al. |
| 8,025,169 B2 | 9/2011 | Zimmerman |
| 8,028,850 B2 | 10/2011 | Zimmerman |
| 8,272,523 B1 | 9/2012 | DeMusis, Sr. |
| 8,534,633 B2 | 9/2013 | Tell |
| 8,560,031 B2 | 10/2013 | Barnett |
| 8,757,418 B2 | 6/2014 | Zimmerman |
| 9,494,184 B1 | 11/2016 | Lee |
| 9,521,919 B1 | 12/2016 | Reyes |
| 9,651,229 B1 | 5/2017 | Huang |
| 9,801,483 B2 | 10/2017 | D'Alesio |
| 9,803,682 B1 | 10/2017 | Chang |
| 9,814,332 B2 | 11/2017 | Zimmerman |
| 10,520,009 B2 | 12/2019 | Smith et al. |
| 10,753,384 B1 | 8/2020 | Chang |
| 10,774,870 B2 | 9/2020 | Kang |
| 11,255,482 B1 | 2/2022 | Zimmerman |
| 11,415,266 B2 * | 8/2022 | Zimmerman ........ F16M 11/041 |
| 2003/0102320 A1 | 6/2003 | Park |
| 2004/0178315 A1 | 9/2004 | Lee |
| 2004/0238541 A1 | 12/2004 | Camp, Jr. |
| 2004/0238542 A1 | 12/2004 | Camp, Jr. et al. |
| 2005/0075666 A1 | 4/2005 | Maas et al. |
| 2006/0175506 A1 | 8/2006 | Lan |
| 2007/0012706 A1 | 1/2007 | Deadman |
| 2007/0205205 A1 | 9/2007 | Kliewer |
| 2008/0093370 A1 | 4/2008 | Darsey |
| 2008/0190948 A1 | 8/2008 | Sayasithsena |
| 2009/0250467 A1 | 10/2009 | Schmidt |
| 2009/0256043 A1 | 10/2009 | Lan |
| 2010/0155550 A1 | 6/2010 | Weiss-Vons |
| 2012/0287560 A1 | 11/2012 | Fan |
| 2012/0329534 A1 | 12/2012 | Barnett et al. |
| 2014/0171157 A1 | 6/2014 | Ho |
| 2014/0326630 A1 | 11/2014 | Henry |
| 2015/0230638 A1 | 8/2015 | Jagger |
| 2016/0258471 A1 | 9/2016 | Orban |
| 2018/0149302 A1 | 5/2018 | Papapanos |
| 2019/0022874 A1 | 1/2019 | Mutch et al. |
| 2019/0024699 A1 | 4/2019 | Mutch et al. |
| 2019/0203759 A1 | 7/2019 | Zimmerman |
| 2020/0232501 A1 | 7/2020 | McClean et al. |
| 2020/0400267 A1 | 12/2020 | Garza |
| 2021/0207647 A1 | 7/2021 | Liao |

FOREIGN PATENT DOCUMENTS

| | | |
|---|---|---|
| CN | 204015832 U | 12/2014 |
| CN | 204105618 U | 1/2015 |
| CN | 104545306 A | 4/2015 |
| CN | 204291083 U | 4/2015 |
| CN | 204500194 U | 4/2015 |
| CN | 105996687 A | 10/2016 |
| CN | 106438659 A | 2/2017 |
| CN | 206060860 U | 3/2017 |
| CN | 207334187 U | 5/2018 |
| DE | 3742636 | 1/1989 |
| EP | 1649788 | 4/2006 |

(56) References Cited

FOREIGN PATENT DOCUMENTS

| | | |
|---|---|---|
| GB | 1534235 A | 11/1978 |
| JP | S4929371 U | 3/1974 |
| JP | H05187430 A | 7/1993 |
| JP | H0685924 U | 12/1994 |
| JP | 2000104724 A | 4/2000 |
| JP | 2003501315 | 1/2003 |
| JP | 2004160079 | 10/2004 |
| JP | 2006314739 | 11/2006 |
| JP | 2014173709 A | 9/2014 |
| KR | 20210104241 A | 8/2021 |
| WO | WO2012008942 | 1/2012 |
| WO | WO2019097212 A1 | 5/2019 |

OTHER PUBLICATIONS

KIPO, Written Opinion of the International Searching Authority, PCT International Application No. PCT/2022/070018 entitled "Quick-Release Anchoring Apparatus With Self-Mounted Anchor Member", dated Sep. 21, 2022, 6 pages.

\* cited by examiner

FIG. 1
FIG. 2
FIG. 3
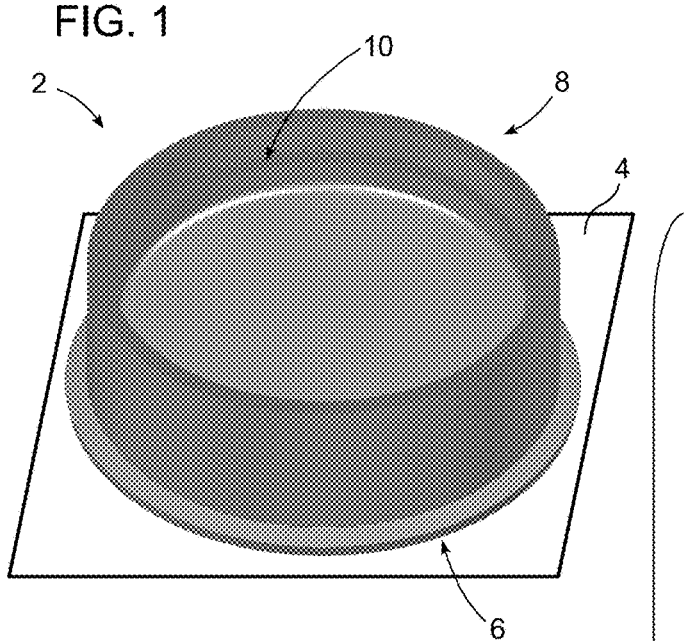
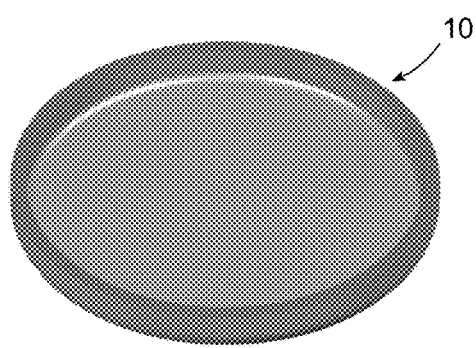
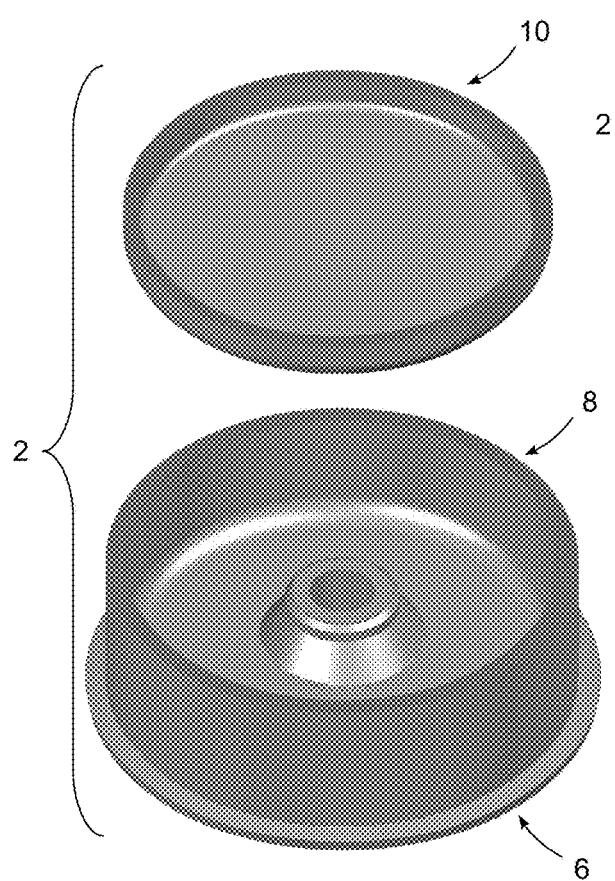
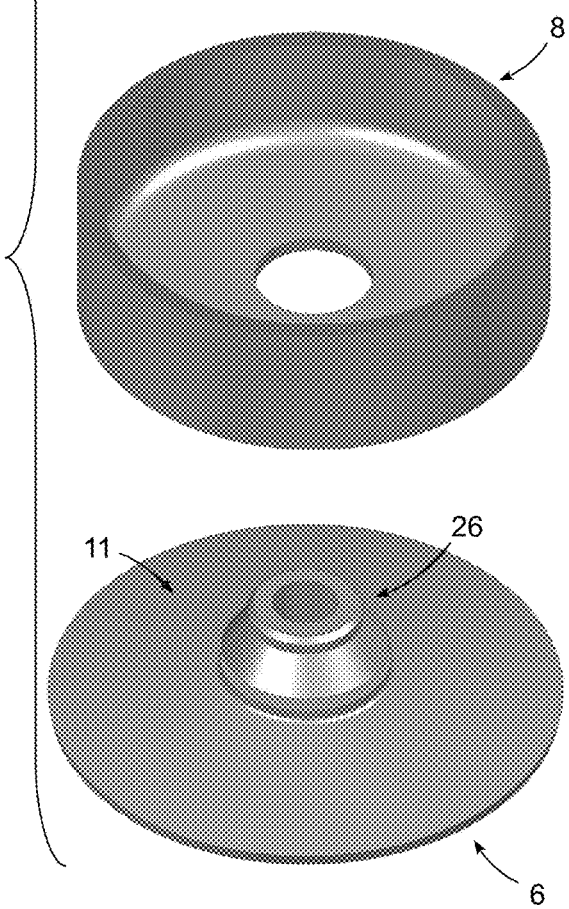

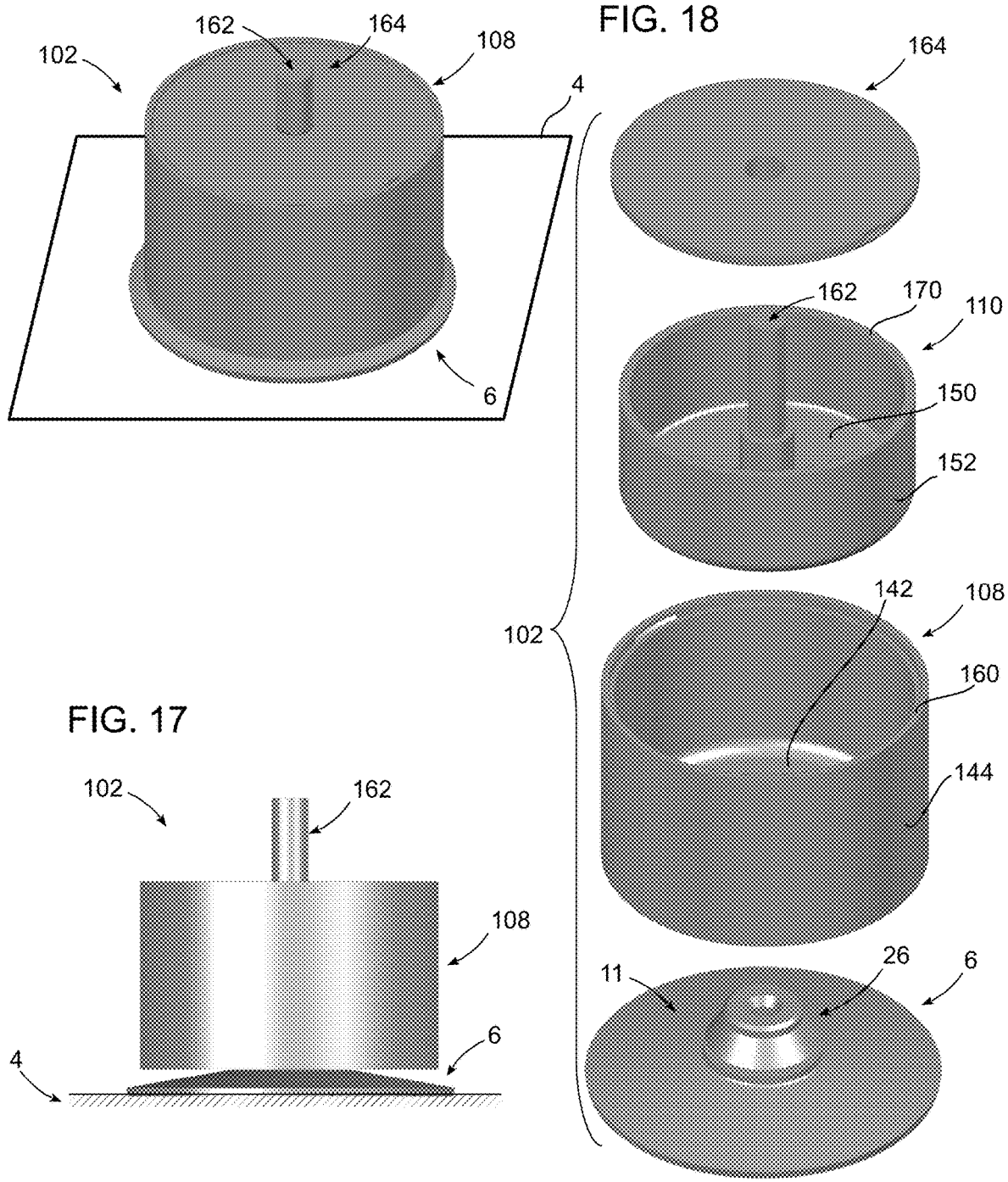

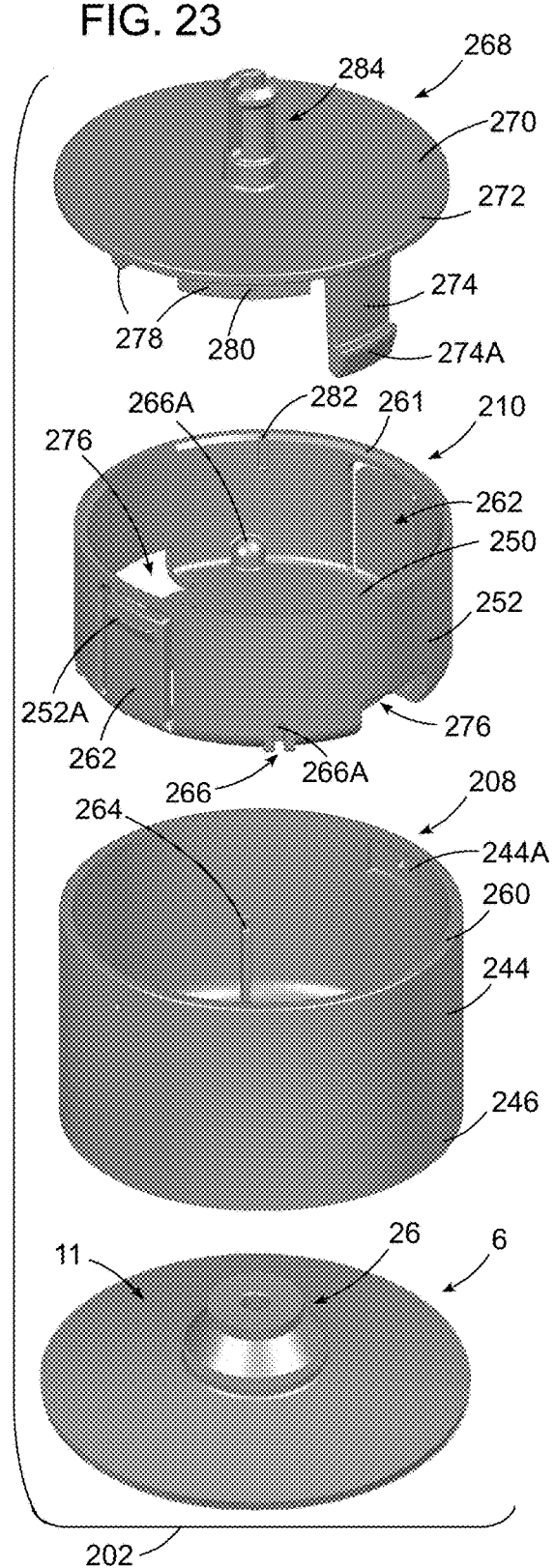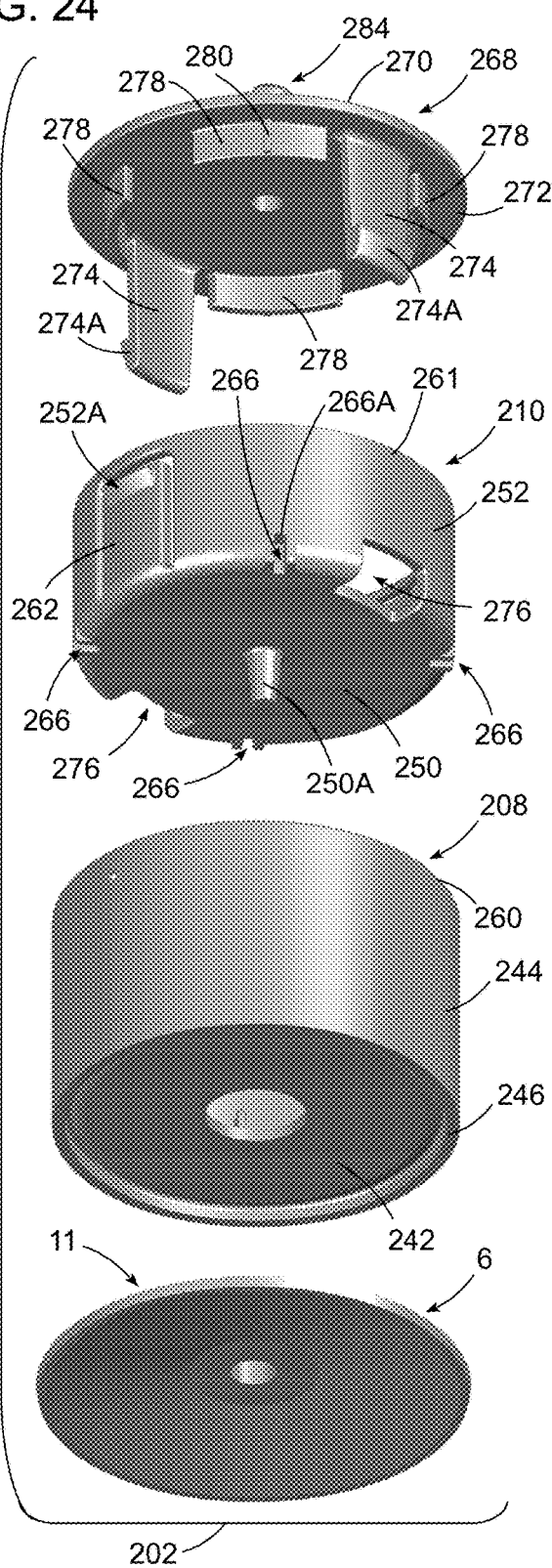

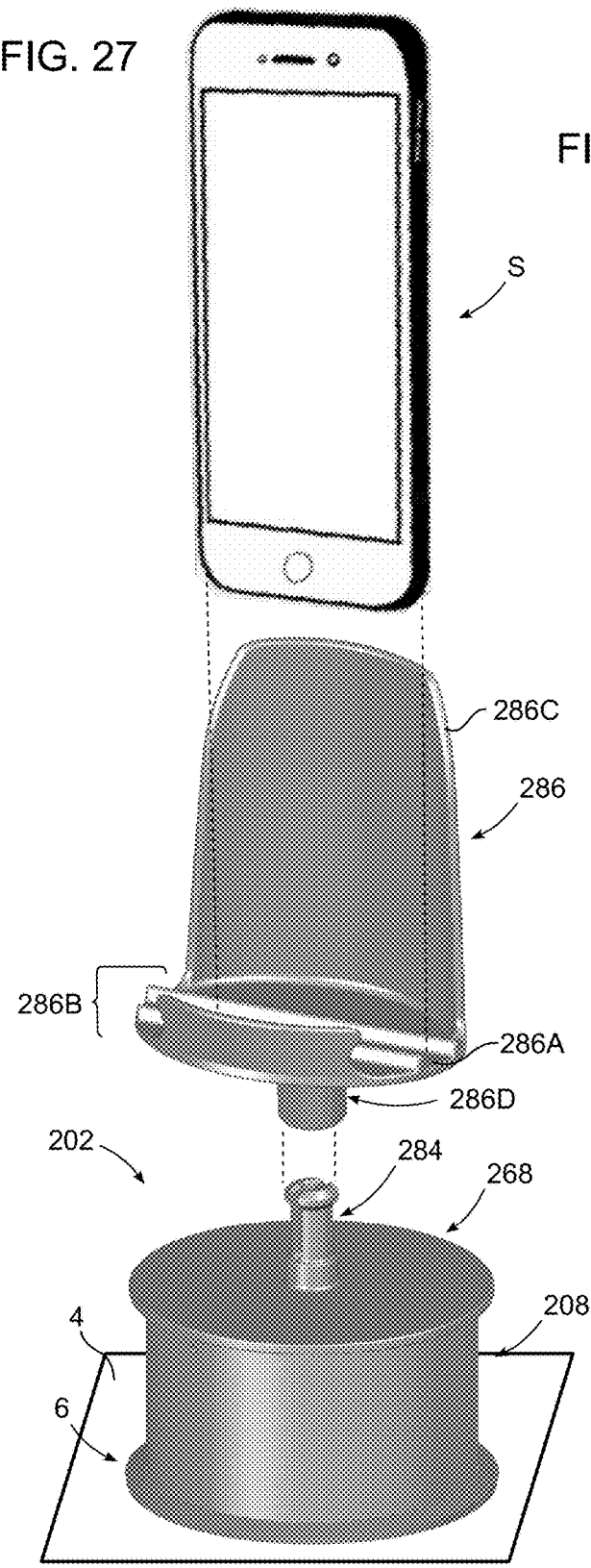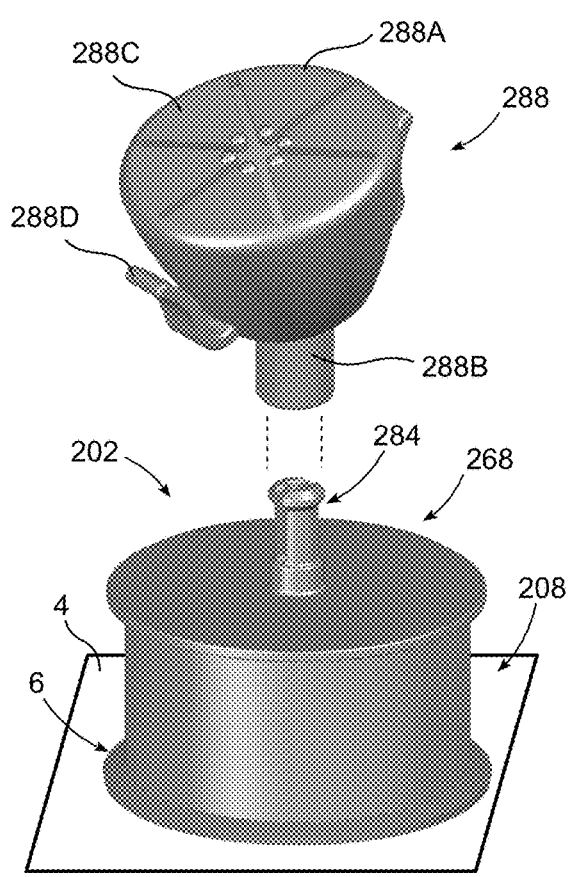

FIG. 29
FIG. 30
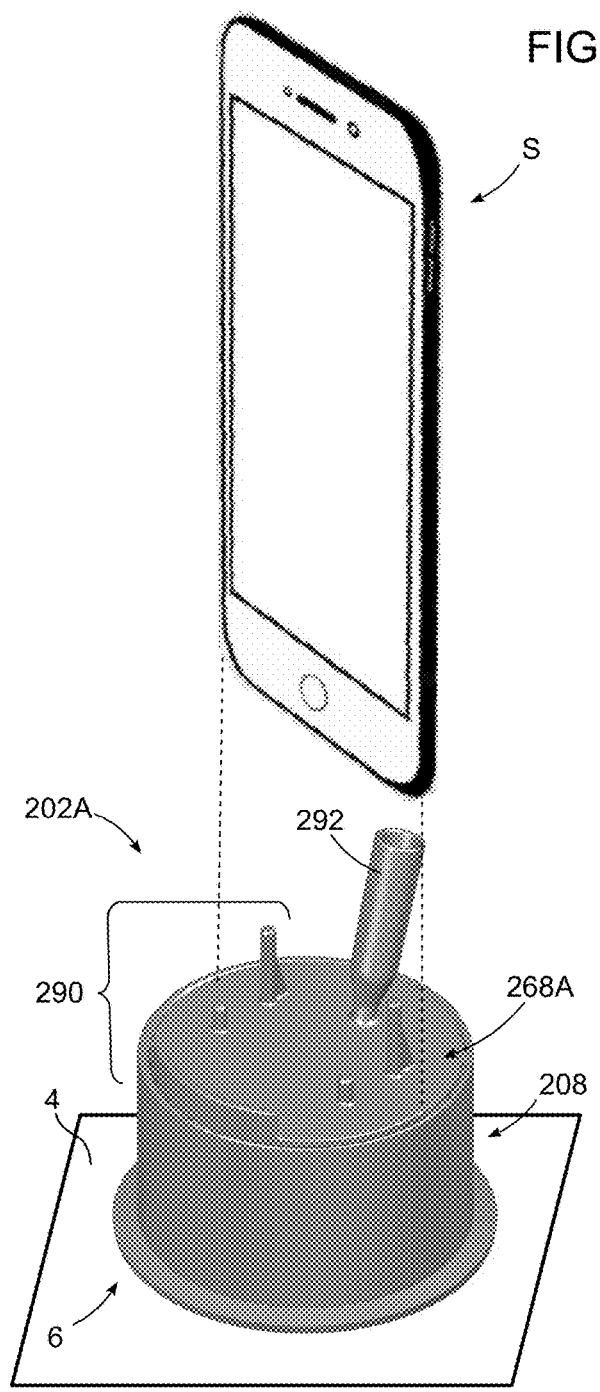
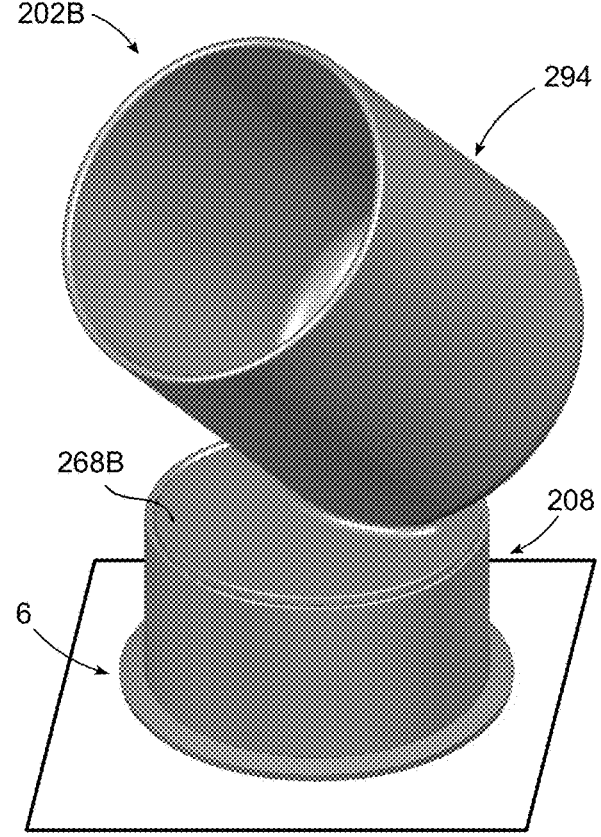

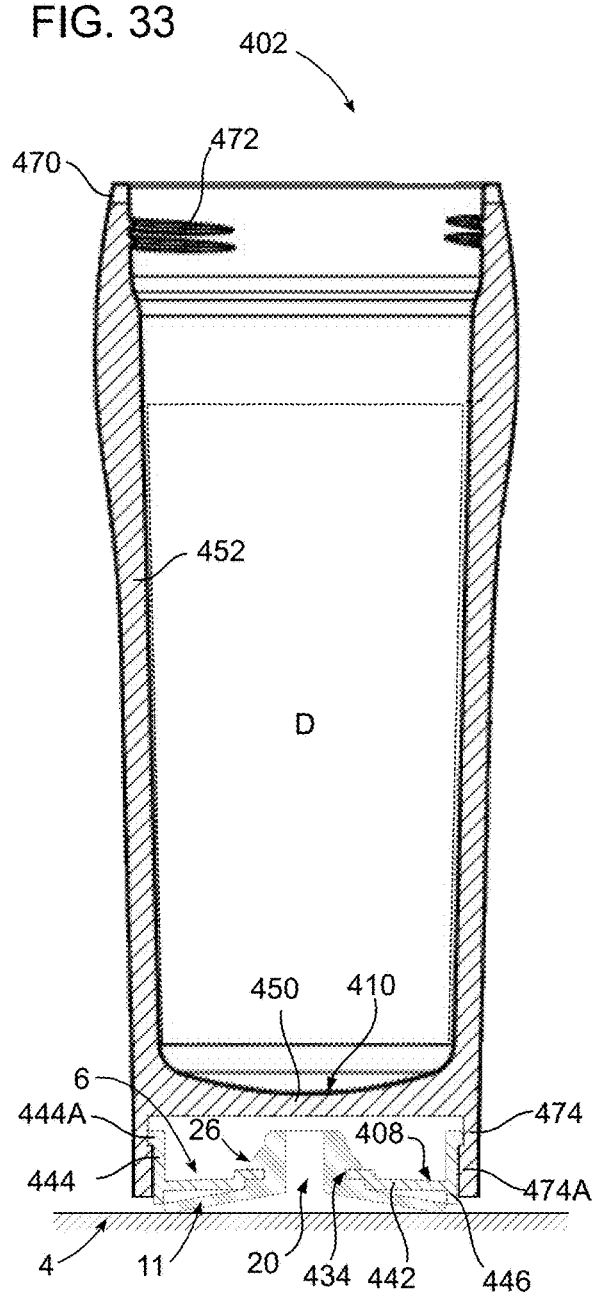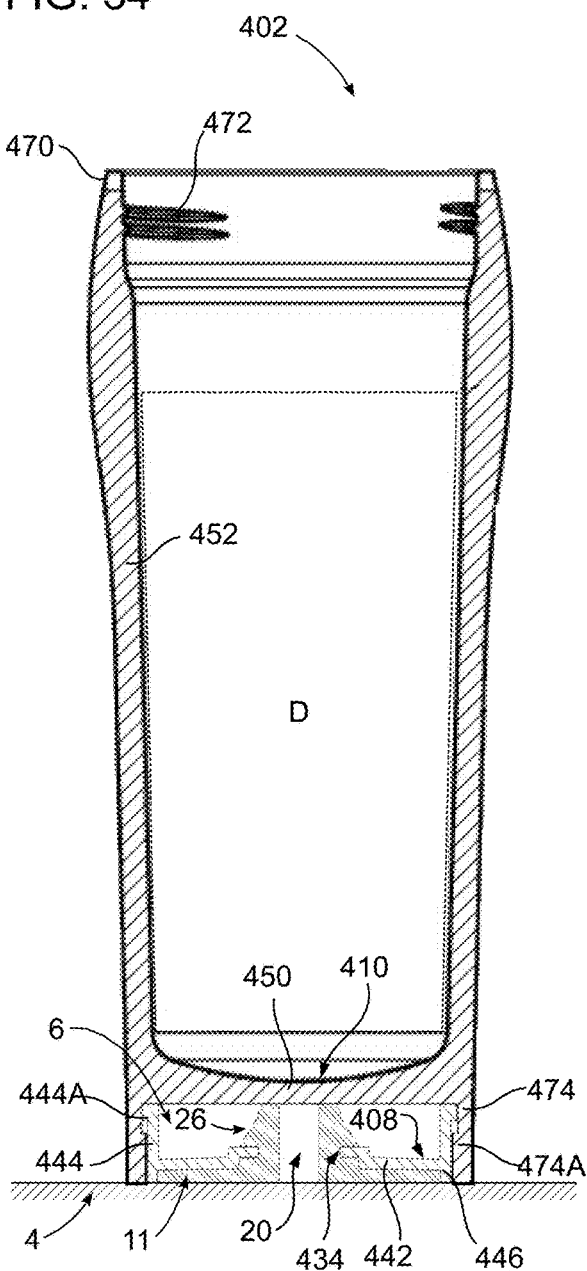

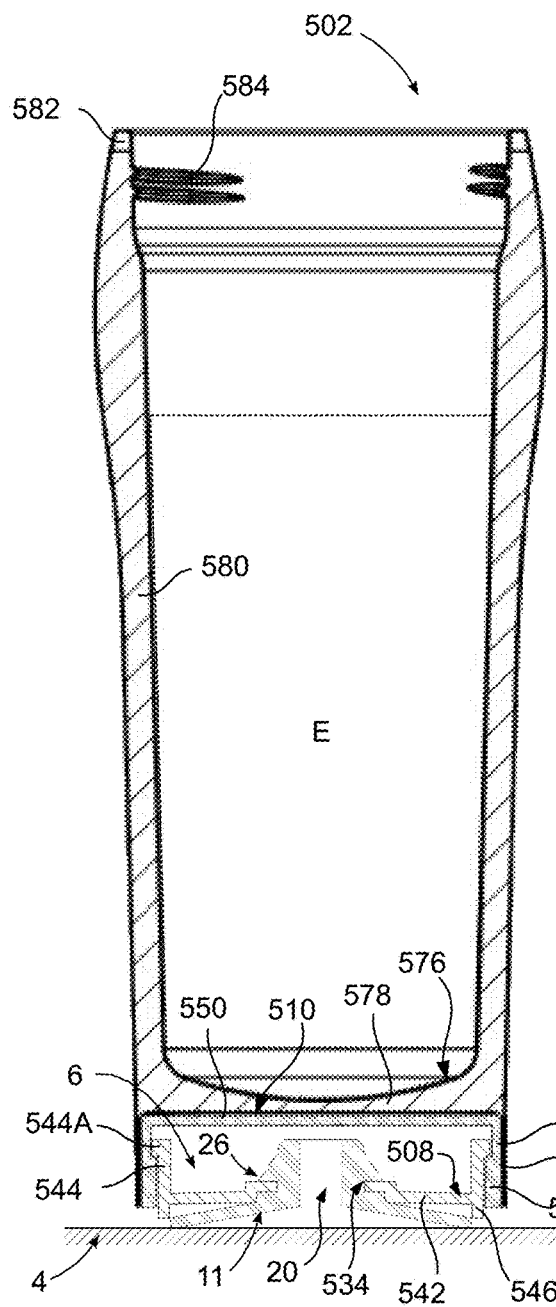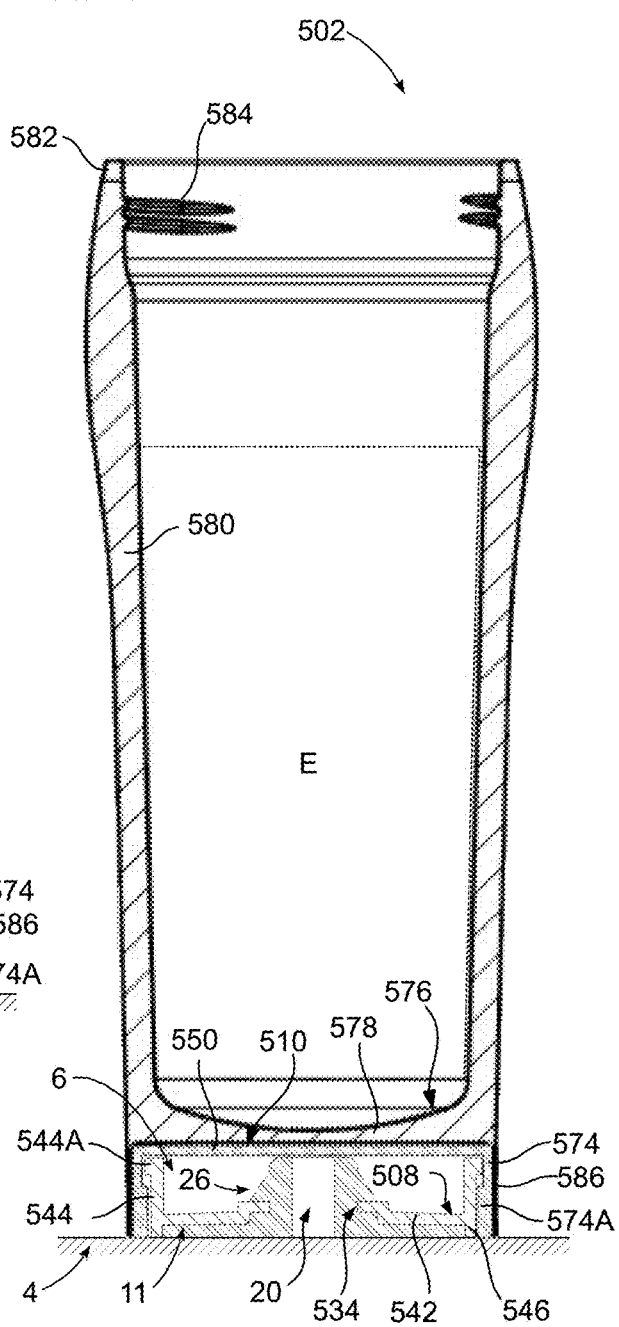

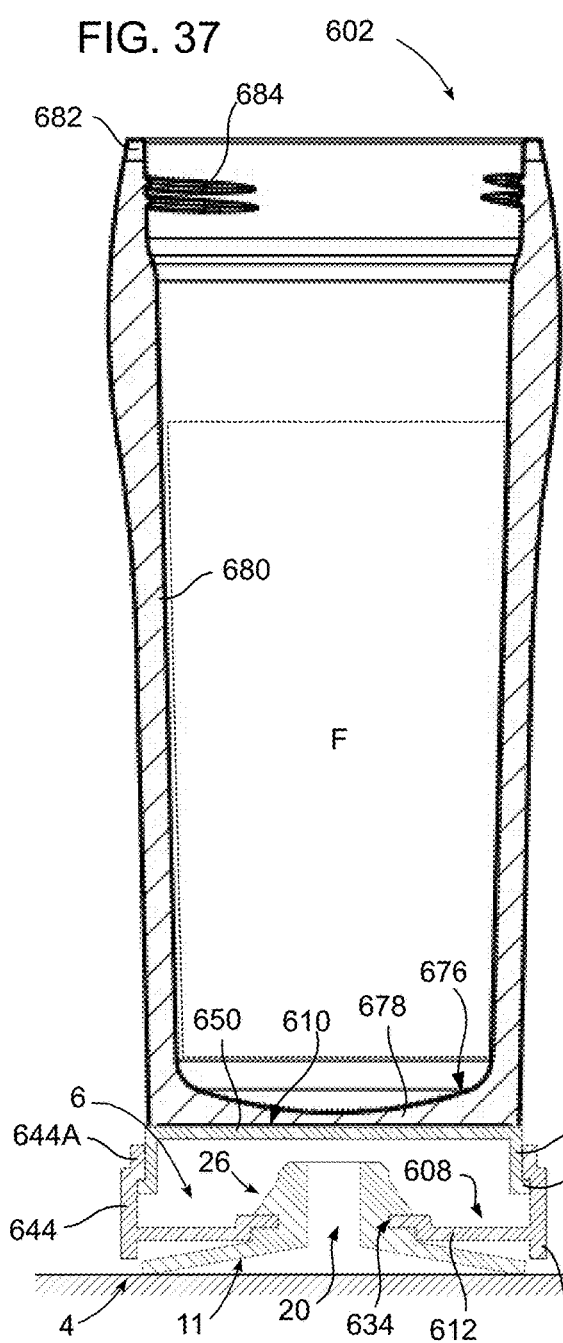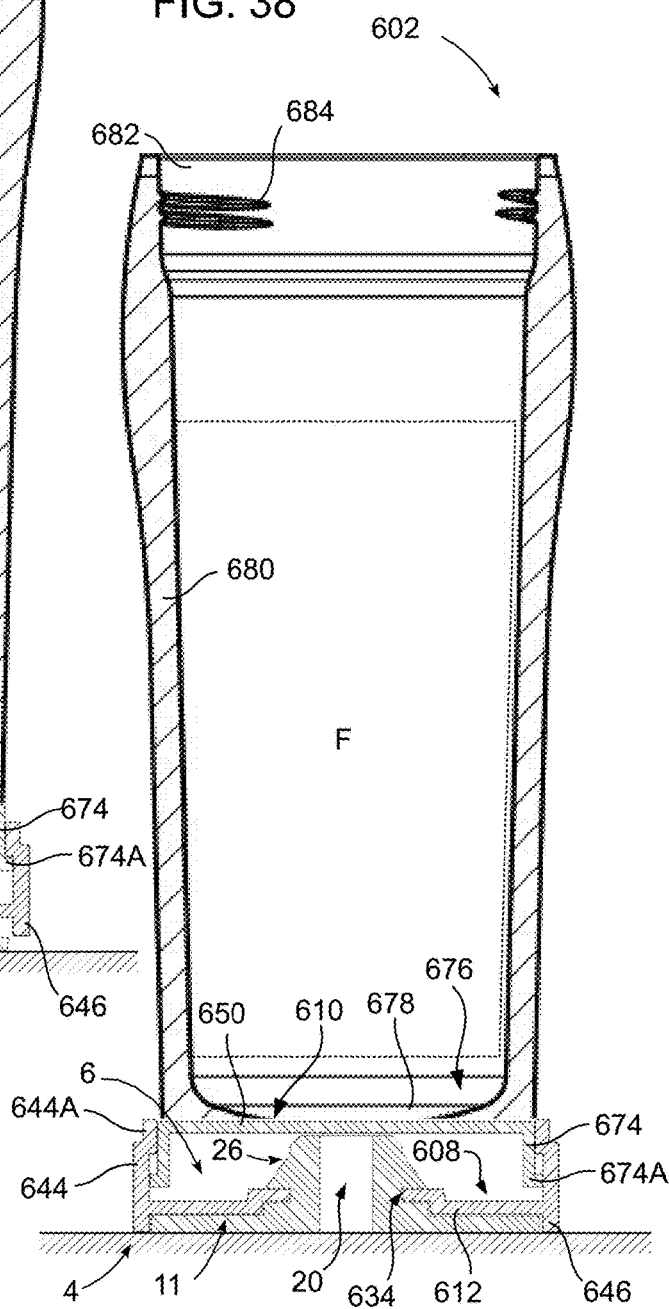

US 11,846,389 B2

QUICK-RELEASE ANCHORING APPARATUS WITH SELF-MOUNTED ANCHOR MEMBER

CROSS-REFERENCE TO RELATED APPLICATIONS

This application is a continuation of U.S. patent application Ser. No. 17/137,710 filed Dec. 30, 2020, the contents of which are incorporated by reference herein.

BACKGROUND

1. Field

The present disclosure relates to anchoring apparatus for releasably securing objects to surfaces. More particularly, the disclosure concerns anchoring apparatus with anchor members that adhere to surfaces by way of differential pressure when flexed. Still more particularly, the disclosure pertains to anchoring apparatus with quick-release differential pressure venting.

2. Description of the Prior Art

By way of background, anchoring apparatus that operate by way of differential pressure are known. Such apparatus often utilize anchor members such as suction cups and suction seal stabilizers. A suction cup typically includes a flexible base seal member configured as an elastomeric dome-shaped structure having a concave lower side and a relatively soft peripheral rim. In order to adhere the suction cup to a reference surface, the base seal member must be affirmatively flexed by pressing it against the reference surface with enough force to temporarily flatten the concave lower side so that air is expelled outside the peripheral rim. When the pressing force is released, the base seal member has a natural tendency to return to its initial dome shape. As this rebounding occurs, the volumetric cavity that lies inside the peripheral rim between the base seal member's lower side and the reference surface begins to enlarge. This in turn causes the air pressure in the volumetric cavity to proportionately decrease in accordance with Boyle's Law. A pressure differential is generated in which the pressure within the volumetric cavity is lower than the ambient air pressure outside the cavity, thereby resulting in a partial vacuum. The partial vacuum produces a suction force that increases until an equilibrium condition is reached wherein the elastic forces tending to return the base seal member to its initial concave configuration are balanced by the vacuum forces. Attempts to pull the suction cup away from the reference surface will only increase the size of the volumetric cavity and further decrease the air pressure therein. The resultant suction force will continue to increase until the pulling force becomes large enough to break the seal between the base seal member's peripheral rim and the reference surface.

Some suction cups are designed so that they can only be removed from the reference surface by applying sufficient brute lifting force to break the seal formed by the base seal member's peripheral rim, or by peeling up the rim to create a small opening that vents the volumetric cavity. Other suction cups are designed with a vent port and are used with anchoring apparatus having a mechanical stopper made of rigid material. The stopper is manually actuated into engagement with the vent port when it is desired to maintain suction, and is manually actuated out of engagement with the vent port when it is desired to break the suction. The stopper is typically hand-operable and cannot be actuated except by way of a specific movement pattern that involves the stopper being moved a noticeable distance.

A suction seal stabilizer includes a base seal member that operates somewhat similarly to a suction cup's base seal member, but is typically less concave, or even flat, and usually made from a softer more resilient material. Alternatively, the base seal member of a suction seal stabilizer may be constructed of the same material as a suction cup base seal member, but is thinner and more flexible than its suction cup counterpart. When a properly designed suction seal stabilizer is placed on a reference surface, no pushing force needs to be applied to flatten the base seal member apart from the weight of the stabilizer itself and any items or materials that it carries. Such devices are thus generally self-sealing (self-anchoring) in a manner that is not noticeable to the user. Because the base seal member is usually highly flexible and may have little or no concavity, its elastic rebound forces may be relatively weak and generally insufficient to overcome the opposing gravitational forces bearing down on the suction seal stabilizer. If the base seal member remains substantially flat against the reference surface with little or no rebound occurring, the suction forces will be negligible or non-existent. In some designs, the suction seal stabilizer may even be capable of being moved laterally over the reference surface with little apparent resistance. On the other hand, large suction forces will be generated when an attempt is made to pull the suction seal stabilizer away from the reference surface, or tilt the stabilizer, such as by applying a side load against an object being carried by the stabilizer. This property of suction seal stabilizers is advantageous for certain applications, such as when the stabilizer supports a beverage container. In that case, the beverage container can be moved laterally if a side load is applied sufficiently close to the reference surface, but will resist tipping and spillage when a side load or acceleration force is applied at higher elevations.

In a typical suction seal stabilizer, a vent port is provided for releasing the stabilizer from the reference surface. In such designs, an anchoring apparatus that incorporates the suction seal stabilizer may include a movable auxiliary component that acts as a mechanical stopper to open and close the vent port. The movable auxiliary component may be configured to carry an item or material that is to be anchored by the anchoring apparatus. Lifting the auxiliary component opens the vent port, allowing the anchoring apparatus to be lifted without appreciable resistance. This provides a form of stealth mode operation in which the user is not aware of the action of the suction seal stabilizer. When the anchoring apparatus is placed back down on the attachment surface, the movable auxiliary component will reengage the vent port, thereby "arming" the suction seal stabilizer into a stabilizing mode.

It is to improvements in the design of anchoring apparatus having anchor members embodied as suction cups or suction seal stabilizers that the present disclosure is directed.

SUMMARY

A quick-release anchoring apparatus includes an anchor member formed of a non-porous resilient material. The anchor member includes a flexible base seal member having a seal member upper side, a seal member lower side, and a seal member peripheral edge defining an outer periphery of the seal member upper side and the seal member lower side. The seal member lower side is configured to engage an external reference surface and form a substantially airtight seal therewith that defines a controlled pressure zone, the controlled pressure zone being situated between the seal member lower side and the reference surface. The anchor member further includes a central anchor member stem extending upwardly from the seal member upper side. The anchor member stem includes a stem lower end disposed on the seal member upper side and a raised stem upper end. A first auxiliary component includes a first auxiliary component main body extending outwardly from the anchor member stem and has a central opening through which the anchor member stem extends. The first auxiliary component further includes a first auxiliary component secondary body extending from the first auxiliary component main body. The anchor member is rigidly self-mounted to the first auxiliary component main body without the use of discrete retainers or fasteners. A vent port extends through the anchor member. The vent port has a lower end disposed on the seal member lower side in fluid communication with the controlled pressure zone and an upper end disposed on the stem upper end in fluid communication with an area of ambient pressure. The vent port upper end is centered within a stem landing zone on the stem upper end that maintains a substantially uniform shape at a substantially fixed location relative to the first auxiliary component during normal use of the anchoring apparatus. A second auxiliary component is slidably mounted to the first auxiliary component and movable between a first position and a second position, the second auxiliary component and the first auxiliary component being discrete components formed independently of each other. The second auxiliary component includes a second auxiliary component sidewall that slidably engages the first auxiliary component secondary body in a manner that minimizes lateral mobility and rotational capability of the second auxiliary component relative to its direction of movement and thereby allows the first auxiliary component to guide the path of the second auxiliary component as it moves between its first and second positions. The first position of the second auxiliary component represents a vent port closure position wherein the second auxiliary component directly engages the stem landing zone and blocks the vent port to prevent the passage of air therethrough, such that the controlled pressure zone is rendered airtight and the base seal member will resist movement of the anchoring apparatus away from the reference surface when the base seal member is flexed in a manner that increases the volume of the controlled pressure zone and decreases the air pressure therein. The second position of the second auxiliary component represents a vent port open position wherein the second auxiliary component lifts out of engagement with the stem landing zone and unblocks the vent port to allow the passage of air therethrough, such that the controlled pressure zone is vented to the area of ambient pressure and the base seal member will not resist movement of the anchoring apparatus away from the reference surface.

BRIEF DESCRIPTION OF THE DRAWINGS

The foregoing and other features and advantages will be apparent from the following more particular description of example embodiments, as illustrated in the accompanying Drawings.

FIG. 1 is an upper perspective view showing an anchoring apparatus according to an example embodiment.

FIG. 2 is a partially exploded upper perspective view showing the anchoring apparatus of FIG. 1.

FIG. 3 is a fully exploded upper perspective view showing the anchoring apparatus of FIG. 1.

FIG. 16 is an upper perspective view showing an anchoring apparatus according to another example embodiment.

FIG. 17 is a side elevation view showing the anchoring apparatus of FIG. 16.

FIG. 18 is a fully exploded upper perspective view showing the anchoring apparatus of FIG. 16.

FIG. 23 is a fully exploded upper perspective view showing the anchoring apparatus of FIG. 21.

FIG. 24 is a fully exploded lower perspective view showing the anchoring apparatus of FIG. 21.

FIG. 27 is an exploded upper perspective view showing the anchoring apparatus of FIG. 21 with a cap member thereof configured as a universal carrier, and with the carrier being connected to an attachment for carrying a smartphone.

FIG. 28 is an exploded upper perspective view showing the anchoring apparatus of FIG. 21 with a cap member thereof configured as a universal carrier, and with the carrier being connected to an attachment for carrying a liquid-containing bottle.

FIG. 29 is an upper perspective view showing the anchoring apparatus of FIG. 21 with an alternative cap member thereof configured as a dedicated attachment for carrying a smartphone.

FIG. 30 is an upper perspective view showing the anchoring apparatus of FIG. 21 with another alternative cap member thereof configured as a dedicated attachment for carrying writing implements.

FIG. 33 is a cross-sectional centerline view showing an anchoring apparatus according to another embodiment, with an open vent port.

FIG. 34 is a cross-sectional centerline view showing the anchoring apparatus of FIG. 33 with a closed vent port.

FIG. 35 is a cross-sectional centerline view showing an anchoring device according to another embodiment, with an open vent port.

FIG. 36 is a cross-sectional centerline view showing the anchoring device of FIG. 35 with a closed vent.

FIG. 37 is a cross-sectional centerline view showing an anchoring device according to another embodiment, with an open vent port.

FIG. 38 is a cross-sectional centerline view showing the anchoring device of FIG. 37 with a closed vent.

DETAILED DESCRIPTION OF EXAMPLE EMBODIMENTS

Figure 4:
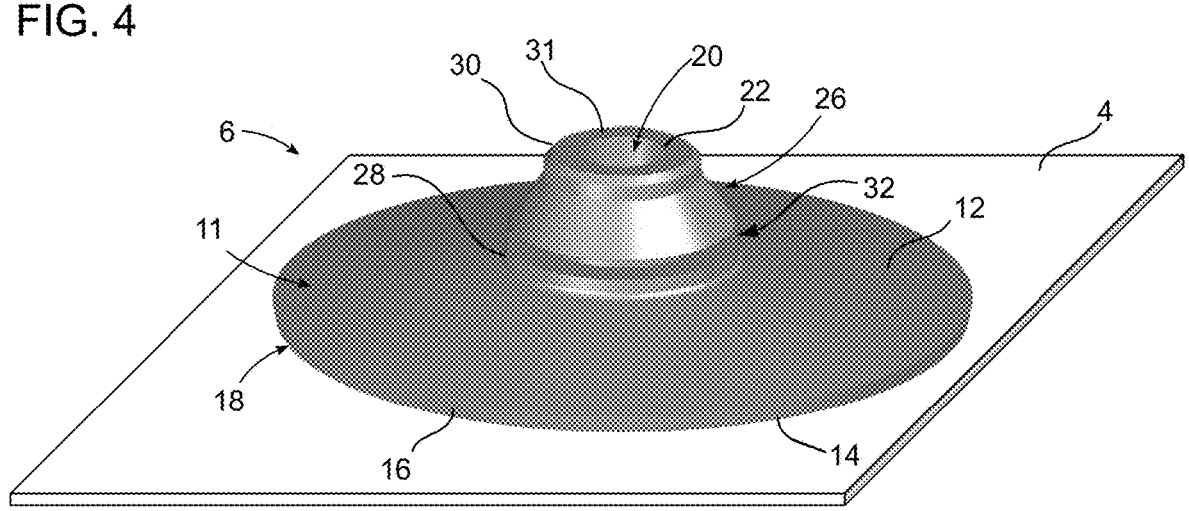
FIG. 4 is an upper perspective view showing an anchor member of the anchoring apparatus of FIG. 1.

Turning now to the drawing figures, in which like reference numbers illustrate like structure in all of the several views, FIGS. 1-3 illustrate one possible embodiment a quick-release anchoring apparatus 2 that may be constructed in accordance with the present disclosure. The anchoring apparatus 2 may be used to provide a unique holder or carrier for one or more items or materials, and provides directional release and attachment capability that allows the apparatus to be secured to a reference surface 4 (FIG. 1) and quickly released therefrom as needed. In the illustrated embodiment, the anchoring apparatus 2 includes an anchor member 6, a first auxiliary component 8 to which the anchor member is rigidly self-mounted (FIG. 2), and a second auxiliary component 10 that is slidably mounted to the first auxiliary component (FIGS. 2-3). As described in more detail below, the first auxiliary component 8 serves as an anchor member carrier that may be fixedly mounted to the anchor member 6. As further described below, the second auxiliary component 10 serves as a movable member or valve actuator that moves relative to the first auxiliary component 8 and the anchor member 6 between and upper first position and a lower second position to selectively actuate a sealing function performed by the anchor member. Although the first auxiliary component 8 and the second auxiliary component 10 are mechanically interconnected, they are discrete components formed independently of each other and thereafter combined during assembly of the anchoring apparatus 2.

Figure 5:
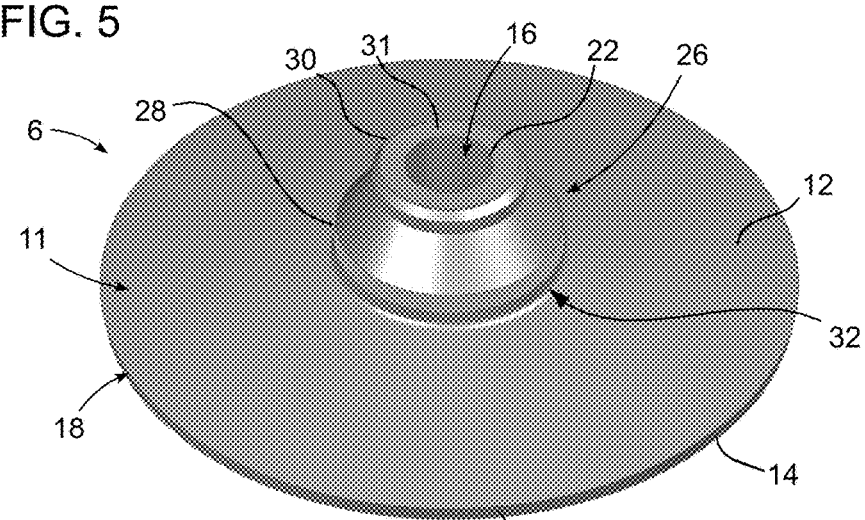
FIG. 5 is a further upper perspective view showing the anchor member of FIG. 4.
Figure 6:
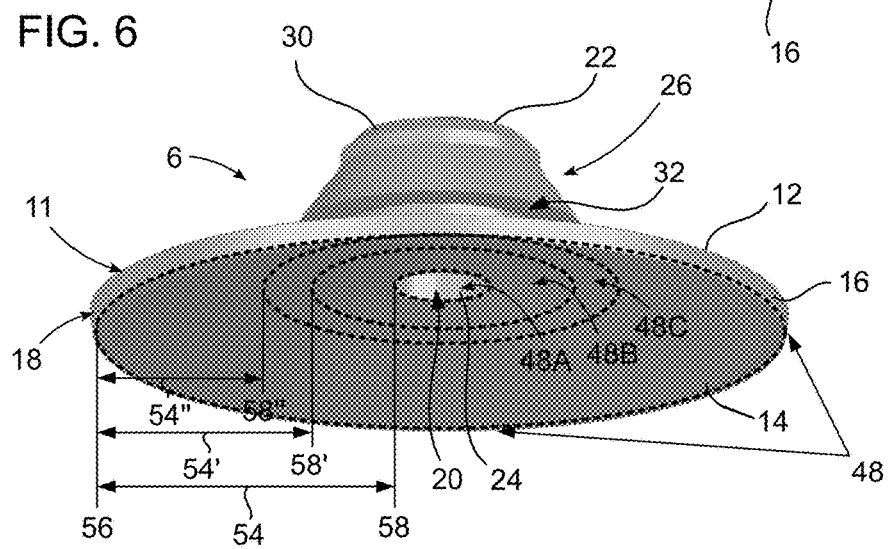
FIG. 6 is a lower perspective view showing the anchor member of FIG. 4.
Figure 7:
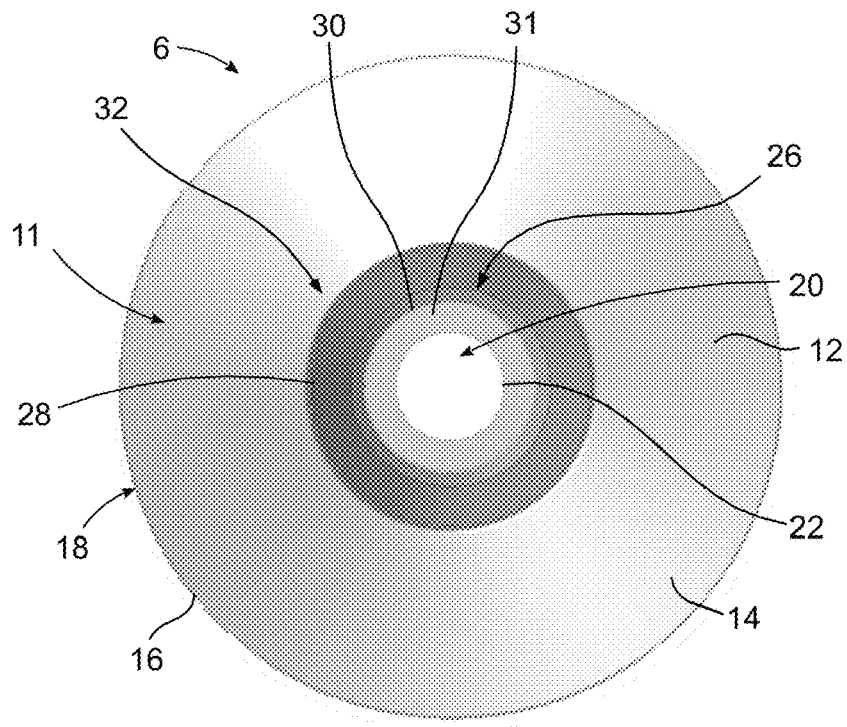
FIG. 7 is a top plan view showing the anchor member of FIG. 4.

Turning now to FIGS. 4-6, the anchor member 6 may be formed entirely as a unitary single-component article manufactured by way of injection-molding or using any other suitable technique. The anchor member 6 could also be formed as an assembly of two or more sub-components. However, a unitary single-component design may be the most cost-effective approach. In its various embodiments, the anchor member 6 can be made from any suitable resilient material that is sufficiently non-porous, flexible and pliant during normal use of the anchoring apparatus 2 to form an effective seal with the reference surface 4. Silicone rubber having a suitable hardness and density represents one such material. Other resilient materials may also be used. Although many different configurations are possible, the anchor member 6 may fundamentally include a base seal member 11 having a seal member upper side 12, a seal member lower side 14, and a seal member peripheral edge 16 that defines an outer periphery 18 of the seal member upper side and the seal member lower side. As additionally shown in FIGS. 7-8, the outer periphery 18 of the base seal member 11 may be of substantially circular shape, with other shapes also being possible.

As noted above, the anchoring apparatus 2 may be used as a holder or carrier for one or more items or materials. Examples of specific holder and carrier apparatus are described below in connection with FIGS. 16-38. Embodiments of the anchoring apparatus 2 may be used to adhere many different types of items or materials (including but not limited to beverage-containing vessels) to the reference surface 4 (such as a table top) by establishing and maintaining a controlled pressure zone that generates a partial vacuum to resist tipping when certain side loads (and/or vertical loads) are applied to the anchoring apparatus. In each of the disclosed anchoring apparatus embodiments, the partial vacuum may be released (sometimes surreptitiously) and the anchoring apparatus lifted away from the reference surface 4 (sometimes without discernible resistance) when the anchoring apparatus (or an article carried thereby) is grasped and maneuvered in a manner consistent with normal lifting thereof.

In some embodiments, the anchor member 6 may be constructed as a suction cup in which the base seal member 11 is sufficiently stiff and concave on its lower surface 14 to require that the anchoring apparatus 2 be actively pushed against the reference surface 4 to flatten the base seal member and develop a sealed controlled pressure zone. In such cases, releasing the anchoring apparatus 2 will cause the base seal member 11 to experience a partial elastic rebound that generates a negative pressure differential in the controlled pressure zone (relative to ambient pressure outside the controlled pressure zone), thereby adhering the anchoring apparatus to the reference surface 4 with an initial suction force. In other embodiments, the base seal member 11 may take the form of a suction seal stabilizer in which the base seal member is sufficiently pliable and non-concave on its lower surface 14 so as not to require that the anchoring apparatus 2 be actively pushed against the reference surface 4 to flatten the base seal member. In such cases, the anchoring apparatus may be self-sealing (self-anchoring) in a manner that is not noticeable to a user. Moreover, the base seal member 11 may not experience sufficient elastic rebound to generate any noticeable negative pressure differential after being placed on the reference surface 4. Lifting the anchoring apparatus 2 can in many cases performed without any apparent resistance being offered by the seal member 11, thus facilitating stealth mode operation. Additional differences between the two types of anchoring members (i.e., suction cups and suction seal stabilizers) are discussed in the Background section above.

A vent port 20 may extend centrally through the anchor member 6, including through the seal member upper side 12 and the seal member lower side 14. The vent port 20, which may be circular or of any other suitable cross-sectional shape, includes a vent port upper end 22 (FIGS. 4-6) disposed above the seal member upper side 12. A vent port lower end 24 (FIG. 6) is disposed on the seal member lower side 14. In the illustrated embodiment of FIGS. 4-6, the vent port 20 may be configured as a straight vertically-oriented cylindrical bore of constant diameter that extends from the vent port upper end 22 to the vent port lower end 24. In other embodiments (described in more detail below) the vent port 20 may not have a constant diameter (e.g, it may be stepped, tapered, etc.).

In the illustrated embodiment of FIGS. 4-6, the vent port upper end 22 is located at the top of a central anchor member stem 26 that may be integrally formed on the base seal member 11 in order to facilitate rigid self-mounting of the anchor member 6 to the first auxiliary component 8 of the anchoring apparatus 2. The anchor member stem 26 may include a stem lower end 28 (FIGS. 4-5) disposed on the seal member upper side 12, and a raised stem upper end 30 (FIGS. 4-6) disposed some distance above the stem lower end. In the illustrated embodiment, the vent port 20 extends concentrically through the anchor member stem 26, along a central vertical axis thereof. In this configuration, the vent port upper end 22 will be disposed on the stem upper end 30, and centered within an annular stem landing zone 31 of the stem upper end 30 that is configured for engagement with the second auxiliary component 10. Advantageously, the stem landing zone 31 maintains a substantially uniform annular shape at a substantially fixed location (relative to the first auxiliary component 8) during normal use of the anchoring apparatus 2. This may be accomplished by designing the anchor member stem 26 so as to be relatively rigid as compared to the base seal member 11.

In the illustrated embodiment of FIGS. 4-6, the relative rigidity of the anchor member stem 26 is due in part to the fact that its height-to-width ratio is low and the stem width is relatively high as compared to the vent port diameter. For example, the height of the anchor member stem 26 as measured between its lower end 28 and its upper end 30 may be approximately the same as its lower end diameter, thereby providing a stem-height-to-width ratio of 1:1. In the illustrated embodiment, the lower end 28 of the anchor member stem 26 represents the maximum diameter of the stem. Various other stem-height-to-width ratios could also be used, depending on the material used for the anchor member 6 and the desired rigidity of the anchor member stem 26. The width of the anchor member stem 26 as measured at its smallest diameter section may be at least twice the width of the vent port 20 as measured at its largest diameter section, thereby providing a stem-to-vent-port-width ratio of at least 2:1. In the illustrated embodiment, the upper end 30 of the anchor member stem 26 represents the minimum diameter of the stem. Various other stem-to-vent-port-width ratios could also be used, again depending on the material used for the anchor member 6 and the desired rigidity of the anchor member stem 26. As noted above, forming the anchor member stem 26 so as to be relatively rigid establishes a stable configuration and position for the stem landing zone 31 (and thus the vent port upper end 26). This stable configuration and position assists in closing the vent port 20 when placing the anchoring apparatus 2 on the reference surface 4 because the vent port will remain in proper alignment with the second auxiliary component 10 as the latter descends into sealing engagement therewith. As discussed in more detail below, side loads applied to the anchoring apparatus 2 will also be more efficiently transferred to the base seal member 11 with a relatively rigid anchor member stem 26, allowing the anchor member 6 to react quickly to initiate or increase its grip the reference surface 4 when the anchoring apparatus is so loaded.

The relative rigidity of the anchor member stem 26 extends not only from the stem upper end 30 to the stem lower end 28, but also through the underlying portion of the base seal member 11 that extends below the vent port lower end 24 to the seal member lower side 14. The anchor member stem 26 is thus well supported and dimensionally stable in the vertical direction. This also assists in closing the vent port 20 when placing the anchoring apparatus 2 on the reference surface 4 because the vent port will always be engaged by the second auxiliary component 10 when the latter descends to a predetermined vertical position. The relative rigidity of the anchor member stem 26 extending down to the seal member lower side 14 in the vicinity of the vent port lower end 24 is in contrast to the relatively thin and flexible configuration of the remaining major peripheral portion of the base seal member 11 extending outwardly from the lower end region of the anchor member stem to the peripheral edge 14.

As noted above, the maximum diameter of the anchor member stem 26 in the illustrated embodiment is at its lower end 28. In a medial section of the anchor member stem 26 that begins above the lower end 28, the anchor member stem may taper to a smaller diameter section that continues above the medial section to the stem upper end 30. As can be seen in FIGS. 4-6, this upwardly tapering portion of the anchor member stem 26 may form a frustocone that defines the medial section. To facilitate mounting of the anchor member 6 to the auxiliary component 8, an annular groove (channel) 32 may be formed at a suitable location on the anchor member stem 26, such as immediately below the tapered medial section. As described in more detail in connection with FIGS. 9-10, the annular groove 32 may engage an anchor member mounting bore 34 formed in the first auxiliary component 8, the bore having a bore upper end 36, a bore lower end 38, and a bore sidewall 40.

Figure 4A:
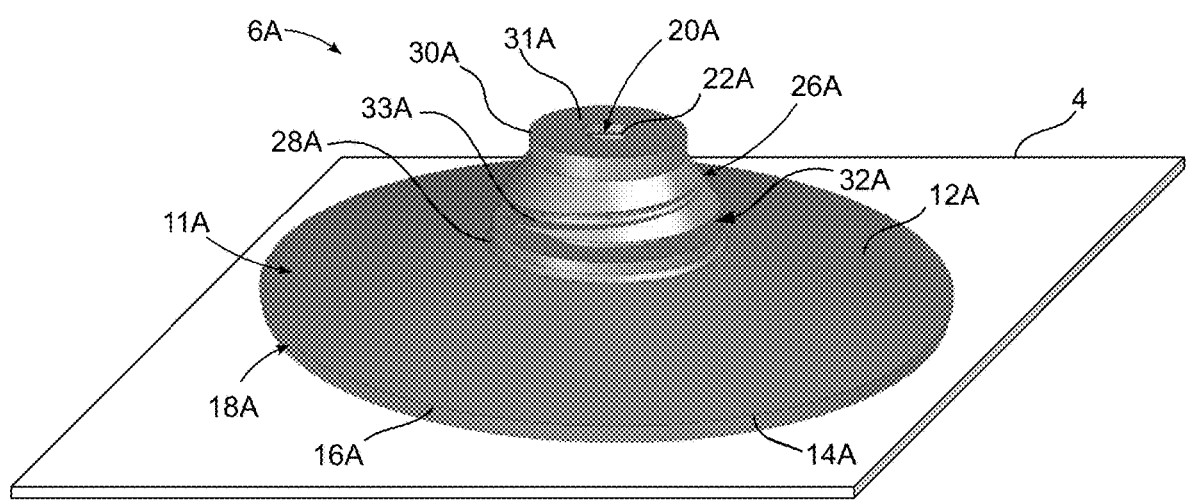
FIG. 4A is an upper perspective view showing an alternative anchor member of the anchoring apparatus of FIG. 1.

As depicted in FIG. 4A, a modified anchor member 6A may be provided that includes the same structural features as the anchor member 6 (as shown by the use of corresponding reference numbers appended with the letter "A"). The modified anchor member 6A differs from the anchor member 6 insofar as the anchor member stem 26A is formed with a helical groove 33A that provides a thread to assist in mounting the anchor member stem to the bore 34 in the first auxiliary component 8. The groove 33A may extend upwardly from the annular groove and wrap partially (or wholly) around the anchor member stem 26A to provide any desired number of thread turns. In the illustrated embodiment of FIG. 4A, the groove 33A wraps between 90-180 degrees, but this is but one example configuration. The thread embodied by the groove 33A provides the ability to rotate the anchor member stem 26A through the bore 34 instead of trying to thrust the stem in a strictly axial manner, which could damage the first auxiliary component 8.

Figure 9:
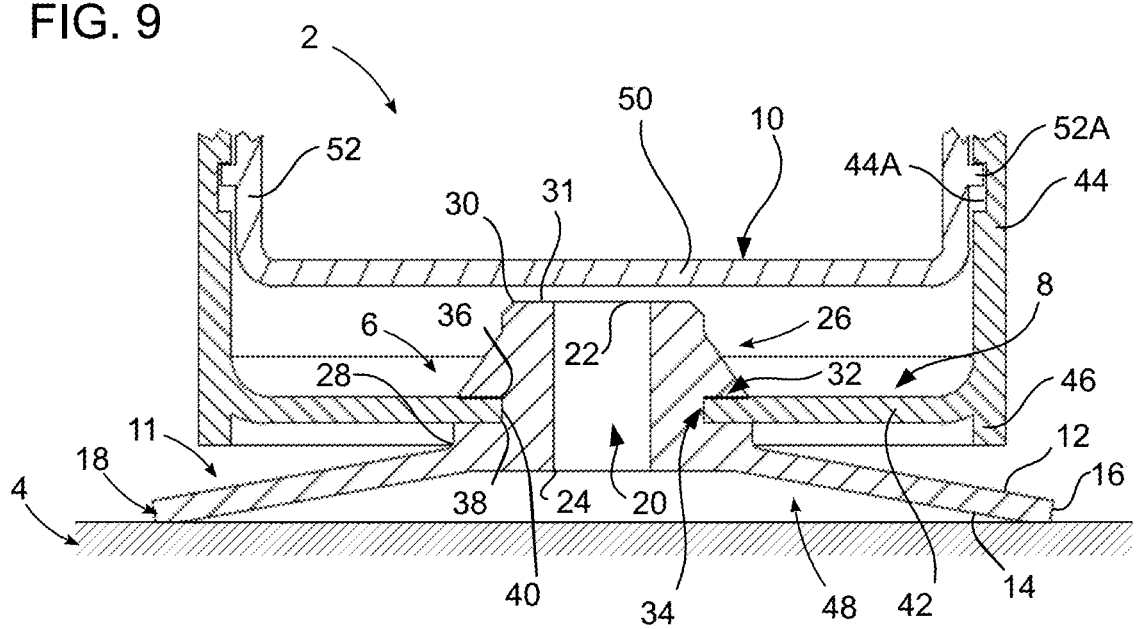
FIG. 9 is a cross-sectional centerline view showing the anchoring apparatus of FIG. 1 with an open vent port.
Figure 10:
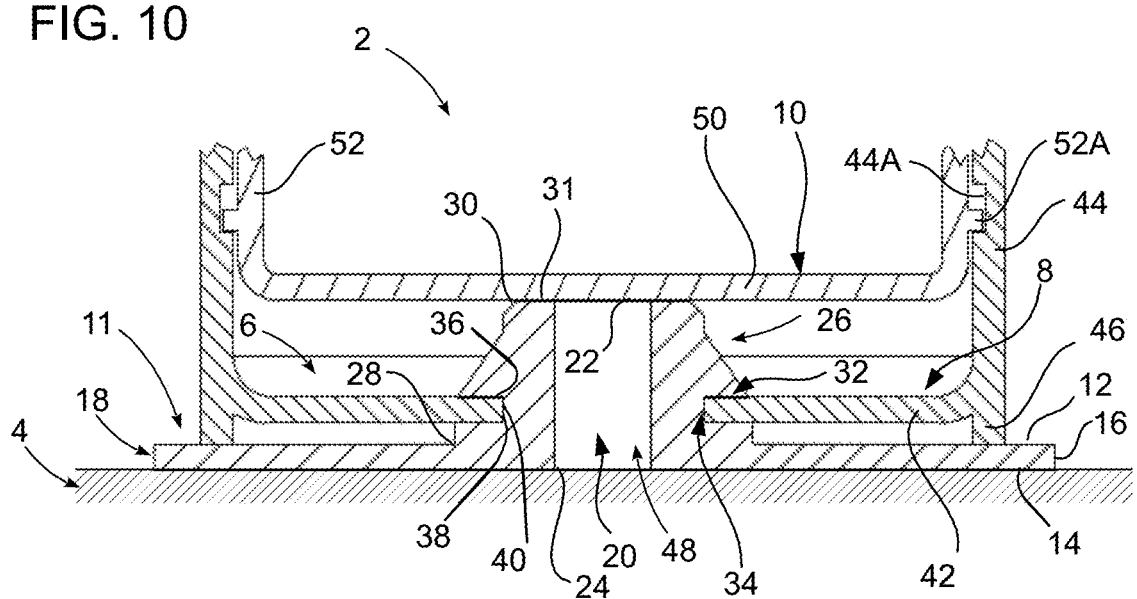
FIG. 10 is a side elevation view showing the anchoring apparatus of FIG. 1 with a closed vent port.

With additional reference now to FIGS. 9-10, the first auxiliary component 8 of the anchoring apparatus 2 may be embodied as any structure that is configured for vertically fixed mounting to the anchor member stem 26 without the use of discrete connecting members, such as fasteners, retainers, etc. This characteristic allows the anchor member 6 to be rigidly self-mounted to the first auxiliary component 8 in a stable vertically fixed relationship therewith. FIGS. 9-10 depict one optional configuration wherein the first auxiliary component 8 takes the form of a rigid (or semi-rigid) main body 42 (e.g., plastic, silicone rubber, etc.) that extends outwardly away from the anchor member stem 26 for some distance. By way of example only, the main body 42 may be formed as a generally circular disk-like structure that surrounds the anchor member stem 26.

The first auxiliary component 8 may be mounted to the anchor member stem 26 by virtue of rigid engagement with a stem mounting portion that may be implemented using the above-mentioned annular groove 32 formed on the anchor member stem 26. As previously noted, the annular groove 32 may be situated immediately below the tapered medial section of the anchor member stem 26. The anchor member mounting bore 34 of the first auxiliary component 8 may be centrally formed in the main body 42. As discussed above, the anchor member mounting bore 34 extends vertically between a bore upper end 36 and a bore lower end 38, and has a bore sidewall 40. It will be appreciated that the position of the bore sidewall 40 relative to the center of the main body 42 is dictated by the diameter of the bore.

The rigid inter-engagement of the annular groove 32 with the anchor member mounting bore 34 includes the back of the groove engaging the bore sidewall 40 and the upper and lower sidewalls of the groove respectively engaging the bore upper and lower ends 36 and 38, together with adjacent surface portions of the first auxiliary component's main body 42. The walls of the annular groove 32 serve to provide engagement projections that engage the anchor member mounting bore 34 and adjacent structure of the first auxiliary component 8. Advantageously, the frustocone shape of the anchor member stem 26 immediately above the annular groove 32 aids in mounting the first auxiliary component 8 to the anchor member 6 by compressibly deforming the anchor member stem as it advances through the anchor member mounting bore 34 until the annular groove seats in the bore. As discussed above, the mounting operation may be further assisted by using the anchor member 6A of FIG. 4A that includes the helical groove 33A on its anchor member stem 26A to facilitate threaded mounting.

The connection between the anchor member 6 and the first auxiliary component 8 may be improved by adhering to several design guidelines. As a first design guideline, the spacing of the bore upper and lower ends 36 and 38 (which defines the thickness of the first auxiliary component's main body 42 proximate to the anchor member mounting bore 34) may be chosen to closely match the spacing of the upper and lower sidewalls of the annular groove 32. As a second design guideline, the diameter of the anchor member mounting bore 34 may be chosen to closely match the diameter at the back of the annular groove 32. Adherence to the first and second design guidelines will ensure a tight fit between the main body 42 and the anchor member stem 26. As a result, side loads applied to the anchoring apparatus 2 will be quickly and efficiently transferred to the anchor member 6, allowing the base seal member 11 to rapidly initiate or increase its grip on the reference surface 4 in response to the loads.

As a third design guideline, the radial depth of the annular groove 32 may be chosen to maximize the interfacial engagement between upper and lower sidewalls of the annular groove and the upper and lower surfaces of the main body 42 proximate to the anchor member mounting bore 34. Adherence to the third design guideline will ensure a stable and secure connection between the anchor member stem 6 and the first auxiliary component 8, and thus the remaining structure of the anchoring apparatus 2 (of which the first auxiliary component forms a part). Detachment of the anchor member 6 from the remainder of the anchoring apparatus 2 during normal use will thus be unlikely, As a fourth design guideline, the location of the annular groove 32 may be chosen to be as close to the seal member upper side 12 as possible. For example, as shown in FIGS. 9-10, the annular groove 32 may be spaced from the seal member upper side 12 by a distance that is approximately the thickness of the base seal member 11 between its upper an lower sides 12 and 14. Other locations proximate to the seal members upper side 12 may also be used. Adherence to the fourth design guideline minimizes rotational moments introduced into the base seal member 11 as a result of side loads applied to the anchoring apparatus 2. As described in more detail below in connection with FIGS. 6 and 8, minimizing the rotational moments imparted to the base seal member 11 will facilitate more gradual deformation thereof in response to side loads, allowing the seal member lower side 14 to gradually peel away from the reference surface with a corresponding gradual increase in gripping strength. In contrast, large rotational moment shock loads imparted quickly to the base seal member 11 can result in rapid separation of the seal member lower side 14 from the reference surface 4, causing the anchor member 6 to rip away from the reference surface and thereby overturn the anchoring apparatus 2.

Observance of the foregoing design guidelines, coupled with the inherent rigidity and relative non-movability of the anchor member stem member 26 itself, results in an assembly in which the anchor member stem and the first auxiliary component 8 will act in concert during normal use of the anchoring apparatus 2. These two structures will act as if they are formed integrally with each other as a single unit despite the fact that the anchor member stem 26 and the first auxiliary component 8 are separate structures that are interconnected without the use of discrete connecting members, such as retainers or fasteners. If the base seal member 11 is additionally considered, the resultant combination may be likened to a natural tree, with the anchor member stem 26 representing the trunk, the first auxiliary component 8 (as well as the second auxiliary component 10) representing the branches, and the base seal member 11 representing the roots. External loads applied to the anchoring apparatus 2 may be likened to the wind. Such forces will be quickly and efficiently transferred from the first auxiliary component 8 to the anchor member stem 26 via their rigid inter-engagement, then reacted down the rigid anchor member stem to the deformable base seal member 11, which will in turn resiliently stabilize the anchoring apparatus 2 via the base seal member's adherence to the reference surface 4.

The first auxiliary component 8 may optionally include additional structure integrated with or otherwise connected to the main body 42. In FIGS. 9-10, the additional structure of the first auxiliary component 8 includes a secondary body 44 that extends upwardly from the periphery of the main body 42 for some distance. By way of example only, the secondary body 44 may be formed as a tube-like structure that surrounds the main body 42. If desired, a tertiary body 46 of the first auxiliary component 8 may extend downwardly from the periphery of the main body 42 to help stabilize the anchoring apparatus 2 on the reference surface 4. By way of example only, the tertiary body 46 may be formed as a tube-like structure that surrounds the main body 42 and has the same diameter as the secondary body 44. As shown in FIG. 10, the tertiary body 46 may extend down to the base seal member's upper side 12 when the anchoring apparatus 2 is adhered to the reference surface 4, provided that the base seal member's peripheral edge 14 extends laterally beyond the lower edge of the tertiary body. Alternatively, the tertiary body 46 may extend down to the reference surface 4 when the anchoring apparatus is adhered thereto, provided that the base seal member's peripheral edge 14 lies within the perimeter of the tertiary body.

The second auxiliary component 10 of the anchoring device 2 may be movable between an upper position (shown in FIG. 9) and a lower position (shown in FIG. 10). In the lower position, the second auxiliary component 10 engages the stem landing zone 31 defined on the upper end 30 of the anchor member stem 26. This engagement closes the vent port 20 and seals the controlled pressure zone, shown by reference number 48, below the seal member lower side 14. In the upper position, the second auxiliary component 10 lifts away from the upper end 30 of the anchor member stem 26, thereby venting the controlled pressure zone 48 to an area of ambient pressure outside the controlled pressure zone, which may be atmospheric pressure.

The second auxiliary component 10 may be configured as any movable structure having the ability to engage the stem landing zone 31 and form a sealable interface therewith that closes the vent port 20 in an airtight manner. FIGS. 9-10 depict one optional configuration wherein the second auxiliary component 10 takes the form of a rigid (or semi-rigid) main body 50 (e.g., plastic, silicone rubber, etc.) situated above the stem upper end 30. By way of example only, the main body 50 may be formed as a generally circular disk-like structure. In the embodiment of FIGS. 9-10, the stem landing zone 31 and a center portion of the main body 50 that engages the stem landing zone are both planar to provide a planar sealable interface configuration. In other embodiments described in more detail below, various non-planar configurations may be used to provide non-planar sealable interfaces.

The second auxiliary component 10 may optionally include additional structure integrated with or otherwise connected to the main body 50. In FIGS. 9-10, the additional structure of the second auxiliary component 10 includes a secondary body 52 that extends upwardly from the periphery of the main body 50 for some distance. By way of example only, the secondary body 52 may be formed as a tube-like structure that surrounds the main body 50.

In the illustrated embodiment of FIGS. 9-10, the secondary body 52 of the second auxiliary component 10 faces the secondary body 44 of the first auxiliary component 8, and is situated in closely spaced relationship therewith. This arrangement provides a slidable mounting configuration whereby the second auxiliary component 10 is slidably mounted to the first auxiliary component 8 in a manner that allows the first auxiliary component to guide the second auxiliary component during the latter component's up and down movement. Although FIGS. 9-10 show the secondary body 52 of the second auxiliary component 10 being nested within the secondary body 44 of the first auxiliary component 8, the relationship of parts could be reversed. Thus, the secondary body 44 of the first auxiliary component 8 could be nested within the secondary body 52 of the second auxiliary component 10.

If desired, the first auxiliary component 8 and the second auxiliary component 10 may be interconnected at one or more locations to prevent inadvertent disassembly of the anchoring apparatus 2 during use. This allows the anchoring apparatus 2 to be lifted from the reference surface 4 by grasping the second auxiliary component 10 (or another structure connected thereto), and performing an upward lifting gesture. The interconnection(s) between the auxiliary components 8 and 10 may be provided at any suitable location on the anchoring apparatus 2, in any suitable manner. FIGS. 9-10 illustrate one non-limiting example wherein one or more connections are provided by inter-engaging slots and tabs. In particular, the secondary body 44 of the first auxiliary component 8 may be formed with one or more elongated slots 44A on its inside surface, and the secondary body 52 of the second auxiliary component 10 may be formed with one or more opposing tabs 52A on its outside surface. When the second auxiliary component 10 moves upwardly from its lower position shown in FIG. 10 to its upper position shown in FIG. 9, the tabs 52A engage the top of the slots 44A to stop further upward movement. In this way, the second auxiliary component 10 will remain in engagement with the first auxiliary component 8. It will be appreciated that the arrangement of parts could be reversed, with the secondary body 44 of the first auxiliary component 8 having tabs and the secondary body 52 of the second auxiliary component 10 having slots.

In FIG. 9, the anchoring apparatus 2 is in a state wherein the second auxiliary component 10 has been lifted to its upper position to open the vent port 20, and the anchoring apparatus is either in the process of being lowered onto the reference surface 4 or raised therefrom. Because the controlled pressure zone 48 is vented, raising the anchoring apparatus 2 may be performed without any suction resistance being offered by the base seal member 11. In the illustrated state of the anchoring apparatus 2, the lower side 10 of the base seal member 11 may (or may not) have a cambered concave configuration, depending on the design of the anchor member 6.

In FIG. 10, the anchoring apparatus 2 is in a state wherein it has been placed onto the reference surface 4 and the second auxiliary component 10 is in its lower position with the vent port 20 being closed. Moreover, the base seal member 11 may have deformed into a state in which the seal member lower side 14 is fully or partially flattened against the reference surface 4. If the anchor member 6 is a suction cup, the seal member lower side 14 might not assume a flattened state until the anchoring apparatus 2 is actively pushed downwardly with some degree of force. If the anchor member 6 is a properly-designed suction seal stabilizer, the weight of the anchoring apparatus 2 alone, or the anchoring apparatus in combination with whatever item(s) or material(s) it carries, may be enough to flatten the seal member lower side 10. In either case, because the controlled pressure zone 48 is not vented, any attempt to destabilize the anchoring apparatus 2 without raising the second auxiliary component 10 will result in suction resistance being generated by the base seal member 11, thereby maintaining the anchoring apparatus upright and in contact with the reference surface 4.

Comparing FIGS. 9 and 10, it will be seen that the stem landing zone 31 and the main body 50 of the second auxiliary component 10 are configured for efficient mutual engagement so as to promote superior sealing of the vent port 20. In the illustrated embodiment, the lower side of the main body 50 completely blankets the stem landing zone 31 by covering the entire surface area thereof, and may in fact be several times larger in areal extent. For example, if the main body 50 and the stem landing zone 31 are both circular, the diameter of the main body may be at least two or more times larger than the diameter of the stem landing zone 31.

Both structures also have conforming surface configurations so as to facilitate mutual surface-to-surface engagement across the entire area of the stem landing zone 31. For example, as shown in the illustrated embodiment of FIGS. 9-10, the lower side of the main body 50 and the stem landing zone 31 may each be substantially planar. In this way, there is little possibility that the main body 52 will not affirmatively engage the stem landing zone 31 and form an airtight planar sealable interface that closes the vent port 20.

Figure 11:
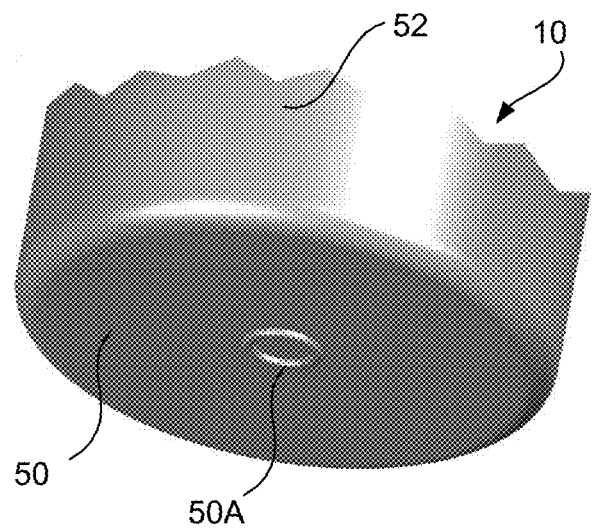
FIG. 11 is a lower perspective view showing a modified second auxiliary component of the anchoring apparatus of FIG. 1 according to an alternative embodiment.
Figure 12:
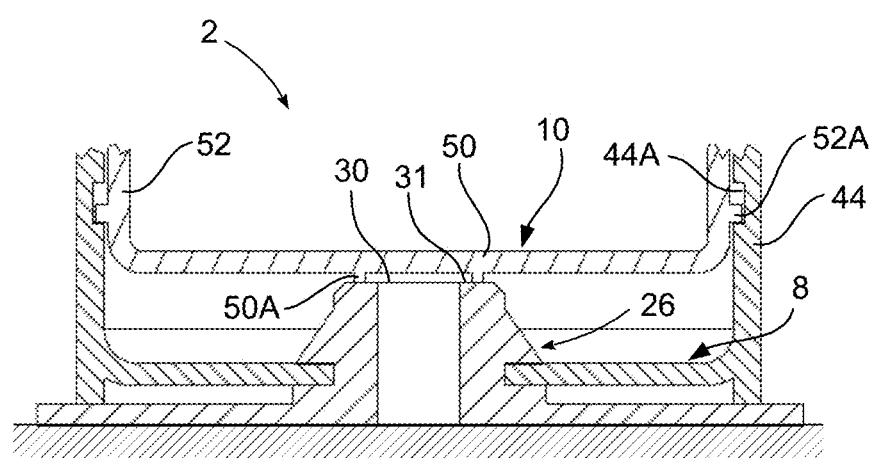
FIG. 12 is a cross-sectional centerline view showing the anchoring device of FIG. 1 with the modified second auxiliary component of FIG. 11.

As alternatively shown in FIGS. 11-12, the second auxiliary component 10 may be optionally configured with a stem engagement structure 50A extending downwardly from the lower side of the main body 50. In the illustrated embodiment, the stem engagement structure 50A is ring shaped, and is sized and positioned to engage the stem landing zone 31 in surrounding concentric relationship with the vent port 20 in the vent port closure position of FIG. 12. Other engagement structure configurations (such as a solid boss instead of a ring) could also be used. It will be appreciated that instead of the stem engagement structure 50A being formed on the main body 50, it could be formed on the stem landing zone 31 and extend upwardly therefrom.

Proper alignment between the stem engagement structure 50A and the stem landing zone 31 may be ensured by designing the anchor member stem 26 and the second auxiliary component 10 to have minimal lateral mobility and minimal rotational capability relative to their respective vertical axes. As previously discussed, minimizing positional movement of the anchor member stem 26 may be achieved by limiting its stem height-to-width ratio and by maximizing the its stem-to-vent-port width ratio, such that the anchor member stem is substantially rigid. Minimizing positional movement of the second auxiliary component 10 may be achieved by designing this component so that its secondary body 52 is very closely spaced from the secondary body 44 of the first auxiliary component 8 so as to limit any tolerances between these components, but without restricting the ability of the second auxiliary component slide up and down with respect to the first auxiliary component.

It will be seen in FIGS. 1-3 and 9-10 that the anchoring apparatus 2 may be implemented as a three-component assembly whose components include the seal member 6, the first auxiliary component 8, and the second auxiliary component 10. When the anchoring apparatus 2 is resting on the support surface 4 in the manner shown in FIG. 10, a user can grasp the secondary body 52 of the second auxiliary component 10, or a structure attached thereto (not shown), and lift the anchoring apparatus 2 upwardly in a normal manner. Doing so will lift the second auxiliary component 10 to its upper position (as shown in FIG. 9), unblock the vent port 20, and vent the controlled pressure zone 48. As a result, the anchoring apparatus 2 may then be lifted away from the reference surface 4 without any apparent resistance above and beyond its own weight and the weight of any item(s) or material(s) being carried thereby. If, on the other hand, the anchoring apparatus 2 is resting on the reference surface 4 and is impacted by a side load that would otherwise tip the anchoring apparatus and dislodge or spill the item(s) or material(s) carried thereby, the vent port 20 will remain closed so long as the stem landing zone 31 is engaged by the main body 50 of the second auxiliary component 10. Instead of the anchoring apparatus 2 tipping, the base seal member 11 will deform in a manner that tends to increase the volume of the controlled pressure zone 48, causing the air pressure therein to decrease so as to develop a dynamically increasing suction force that stabilizes the anchoring apparatus on the reference surface 4.

Figure 8:
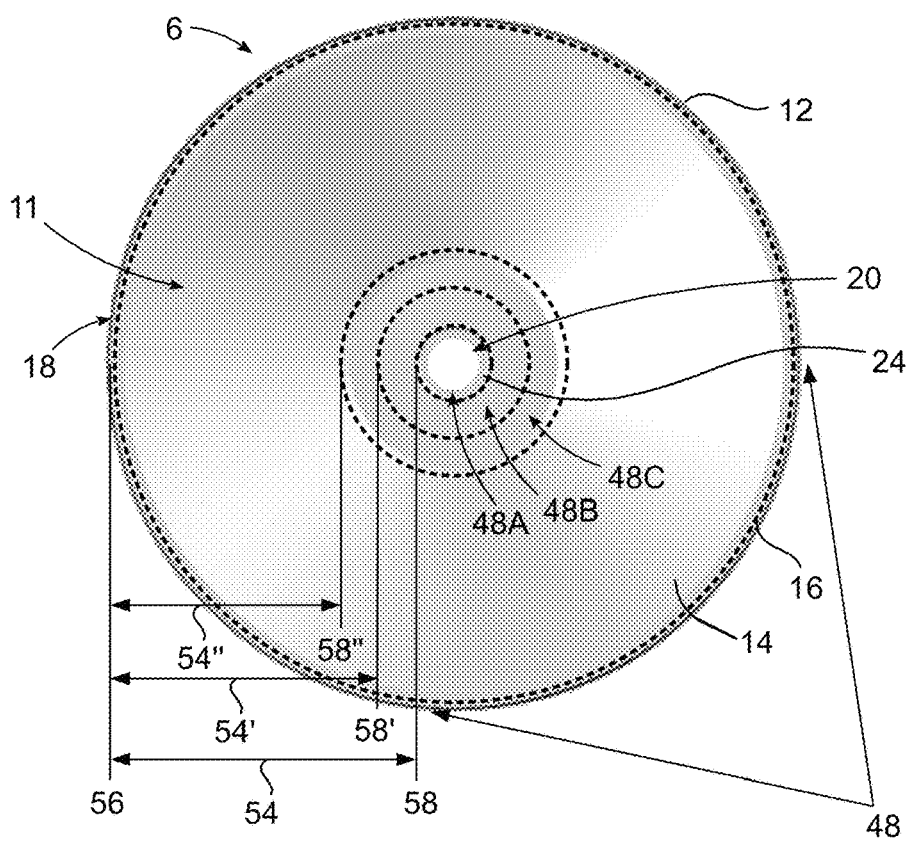
FIG. 8 is a bottom plan view showing the anchor member of FIG. 4.

Regardless whether the anchor member 6 is designed as a suction seal stabilizer or a suction cup, its configuration will be such that when the seal member lower side 14 engages the reference surface 4 with the vent port 20 blocked by the second auxiliary component 10, a substantially airtight seal is formed that seals the controlled pressure zone 48. In the illustrated embodiment of FIGS. 1-10, the controlled pressure zone 48 represents a circular region of variable size located within the base seal member's outer periphery 14 and between the seal member lower side 10 and the reference surface 4. The general region where the controlled pressure zone 48 is capable of developing is shown in FIGS. 6 and 8. It will be appreciated that the size and shape of the controlled pressure zone 48 may vary according to the construction of the base seal member 11 and the applied forces that produce deformations thereof during use of the anchoring apparatus 2, as will now be described.

When the base seal member 11 is in sealing contact with the reference surface 4, some portion of the seal member lower side 14 may lie flat on the reference surface in conforming interfacial contact therewith so as to form an airtight seal region 54. The airtight seal region 54 may be annular in shape, having a radial outer edge and a radial inner edge. The controlled pressure zone 48 will tend to lie radially inside the inner edge of the annular airtight seal region 54, which establishes a controlled pressure zone periphery.

In FIGS. 6 and 8, example locations of the airtight seal region's inner and outer edges are shown using dashed-line representations. When the base seal member 11 is in sealing contact with the reference surface 4, the outer edge of the airtight seal region 54 may lie at or near the base seal member's outer periphery 18, as indicated by reference number 56 in FIGS. 6 and 8. This position will typically not change as a result of subsequent deformations of the base seal member 6 so long as the anchoring apparatus 2 remains adhered to the reference surface 4. The inner edge of the airtight seal region 58 will lie radially inwardly from the base seal member's outer periphery 18, somewhere between the outer edge location 56 and the vent port 20.

In some configurations of the base seal member 11, the seal member lower side 14 may be completely flat in the base seal member's state of sealing contact with the reference surface 4. In that case, the airtight seal region 54 may extend all the way from its outer edge 56 to the vent port 20. Reference number 58 in FIGS. 6 and 8 indicates an example placement of the airtight seal region's inner edge at this location. When the airtight seal region inner edge 58 is thus situated, the controlled pressure zone 48 will have a negligible volume that may be defined solely by the area of the vent port 20, as shown by reference number 48A in FIGS. 6 and 8.

In other configurations of the base seal member 11, the seal member lower side 14 may not be completely flat in the base seal member's state of sealing contact with the reference surface 4. For example, an inner circular area of the seal member lower side 10 that is centered on the vent port 20 may be raised above the reference surface 4. One example of this condition is illustrated in FIG. 9. In that case, the airtight seal region 54 may extend only part of the way from its outer edge 56 to the vent port 20, with the inner edge 58 of the airtight seal region 54 being situated at the perimeter of the inner circular area where the seal member lower side 10 begins to rise above the reference surface 4.

Reference number 58' in FIGS. 6 and 8 indicates an example placement of the airtight seal region's inner edge at such an intermediate location. When the airtight seal region inner edge 58' is thus situated, the controlled pressure zone 48 may have a non-negligible volume that extends beyond the area of the vent port 20 to the perimeter of the raised inner circular area, as shown by reference number 48B in FIGS. 6 and 8.

At some point while the base seal member 11 is in sealing contact with the reference surface 4, the anchoring apparatus 2 may be acted by outside forces that tend to separate the base seal member from the reference surface. Such forces include lifting forces directed away from the reference surface 4, tilting forces directed laterally at some distance above the reference surface, or combinations of such forces. When outside forces of this type are applied, the natural flexibility and pliability of the base seal member 11 will allow it to deform. Such deformations may be characterized by a radial inner portion of the airtight seal region 56 tending to separate from the reference surface 4, causing the inner edge 58 of the airtight seal region to dynamically reposition radially outwardly toward the outer edge 56. Reference number 58" in FIGS. 6 and 8 represents one example dynamic repositioning of the inner edge 58 that produces an airtight seal region 54" of reduced size. Such repositioning of the airtight seal region's inner edge 58" correspondingly produces an enlarging void at the center of the seal member lower side 14 and thereby expands the volume of the controlled pressure zone 48. Reference number 48C in FIGS. 6 and 8 illustrates such an expanded controlled pressure zone. The air pressure within the expanded controlled pressure zone 48C, which is sealed in an airtight manner, will consequently decrease in accordance with Boyle's law, thereby causing the anchoring apparatus 2 to experience increased adherence to the reference surface 4.

As previously noted, the foregoing base seal member deformation scenario only arises when the vent port 20 is closed by the second auxiliary component 10, as shown in FIG. 10. When the vent port 20 is open, as shown in FIG. 9, the controlled pressure zone 48 will be vented to an area of ambient pressure outside the controlled pressure zone 48, which may be atmospheric pressure.

Because the underside of the main body 50 of the second auxiliary component 10 engages the stem landing zone 31 and closes the vent port 20 when the second auxiliary component is its lower position, the main body 50 may be thought of as forming a valve and the stem landing zone 31 may be thought of as forming a valve seat. In FIGS. 9-10, the valve and valve seat are both planar so as to provide a planar sealable interface. In the alternative embodiment of FIGS. 11-12, the valve seat provided by the stem landing zone 31 is planar while the valve provided by the main body 50 of the second auxiliary component 10 is the ring shaped stem engagement structure 50A.

Figure 13:
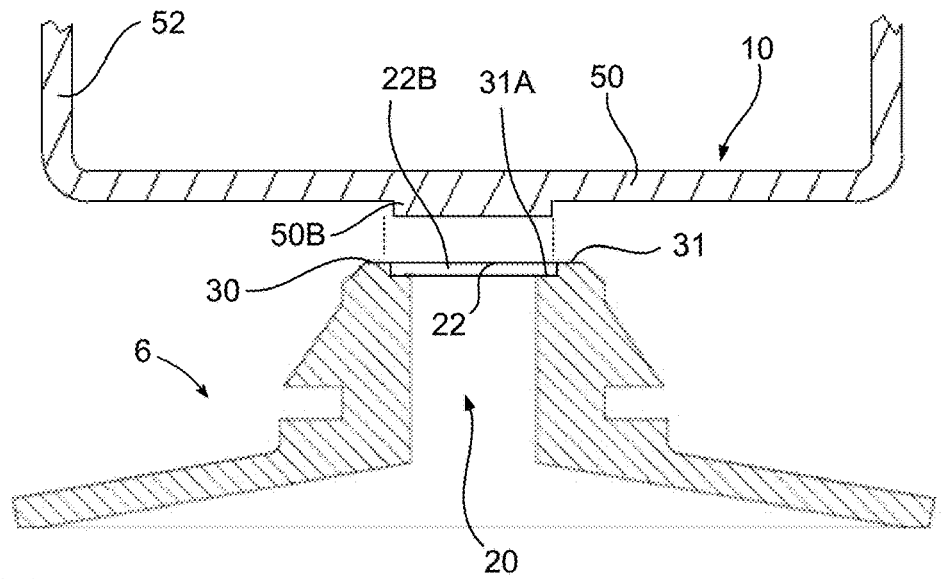
FIG. 13 is a cross-sectional centerline view showing a modified second auxiliary component of the anchoring apparatus of FIG. 1 according to another alternative embodiment, with the modified second auxiliary component being in proximity to a modified anchor member of the anchoring apparatus.
Figure 14:
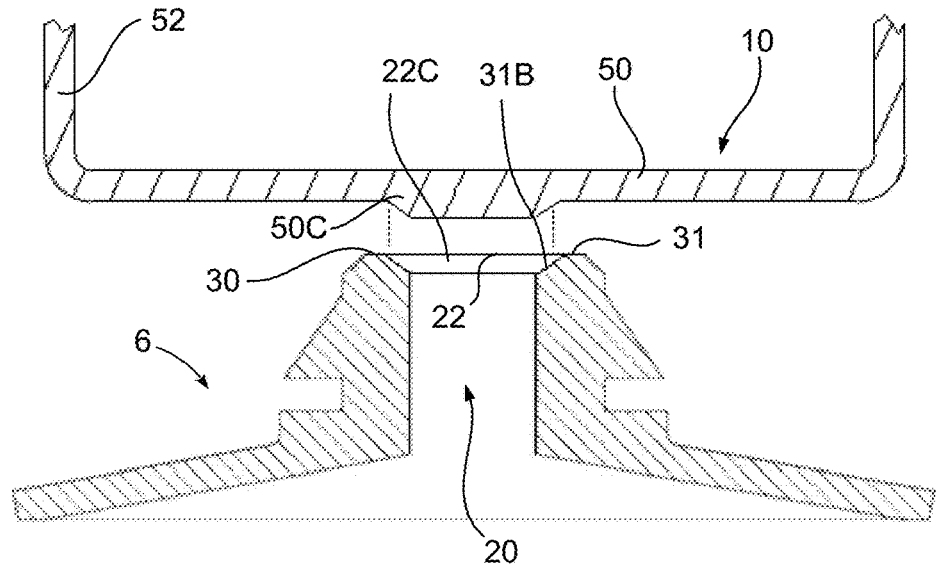
FIG. 14 is a cross-sectional centerline view showing a modified second auxiliary component of the anchoring apparatus of FIG. 1 according to another alternative embodiment, with the component being in proximity to a modified anchor member of the anchoring apparatus.
Figure 15:
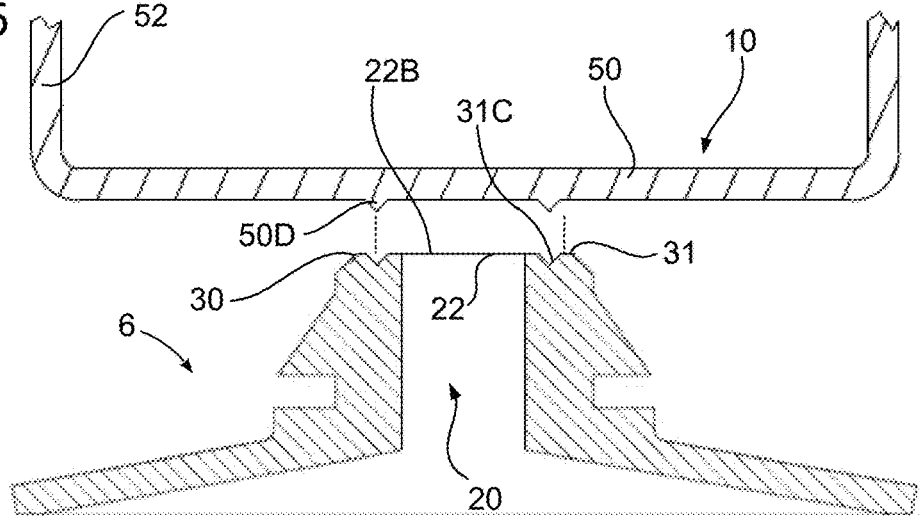
FIG. 15 is a cross-sectional centerline view showing a modified second auxiliary component of the anchoring apparatus of FIG. 1 according to another alternative embodiment, with the second auxiliary component being in proximity to a modified anchor member of the anchoring apparatus.

Further alternative valve-valve seat arrangements are shown in FIGS. 13-15. In FIG. 13, an example valve-and-seat configuration is shown wherein the main body 50 of the second auxiliary component 10 is formed with a lower disk-like protrusion 50B of cylindrical shape. The stem landing zone 31 is modified by forming a counterbore hole 22B at the upper end 22 of the vent port 20. The counterbore hole 22B defines an annular sub-landing zone 31A that is recessed below the stem landing zone 31.

In FIG. 14, an example valve-and-seat configuration is shown wherein the main body 50 of the second auxiliary component 10 is formed with a lower countersunk protrusion 50C shaped as a trapezoidal surface of revolution. The stem landing zone 31 is modified by forming a countersunk hole 22C at the upper end 22 of the vent port 20. The countersunk hole 22C defines a tapered sub-landing zone 31B that is recessed below the stem landing zone 31.

In FIG. 15, an example valve-and-seat configuration is shown wherein the main body 50 of the second auxiliary component 10 is formed with a lower ring-like protrusion 50D shaped as a triangular surface of revolution. The stem landing zone 31 is modified by forming a ring depression (e.g., a circular groove) 31C of triangular cross-section in the stem landing zone 31, with the ring depression concentrically surrounding the vent port upper end 22. It will be appreciated that the arrangement of the protrusion 50D and the ring depression 31C could be reversed, such that the protrusion is formed on the stem landing zone 31 and the ring depression is formed on the main body 50.

Turning now to FIGS. 16-20, an alternative anchoring apparatus 102 is shown that is similar to the anchoring apparatus 2 of FIGS. 1-10, and may be formed from the same materials, but has auxiliary components constructed in a particular manner according to an intended use of the anchoring apparatus. Correspondence between components of the embodiment of FIGS. 16-20 and like components of the embodiment of FIGS. 1-10 is indicated by using corresponding reference numbers incremented by 100.

FIGS. 16-18 illustrate an arrangement of the major structures of the anchoring apparatus 102. In the anchoring apparatus 102, a first auxiliary component 108 may include a circular disk-like main body 142 rigidly self-mounted to the anchor member stem 26 of the anchor member 6. A tube-like secondary body 144 of the first auxiliary component 108 may extend upwardly from the periphery of the main body 142 to an upper edge 160 that may be circular in shape. As additionally shown in FIGS. 19-20, a tube-like tertiary body 146 of the first auxiliary component 108 may extend downwardly from the periphery of the main body 142 to help stabilize the anchoring apparatus 102 on the reference surface 4. A second auxiliary component 110 may include a circular disk-like main body 150. A tube-like secondary body 152 of the second auxiliary component 110 may extend upwardly from the periphery of the main body to an upper edge 170 that may be circular in shape. A center portion of the main body 150 may be formed with an integral mounting structure 162 that extends upwardly therefrom and can be used to mount one or more items or materials "A" to be carried by the anchoring apparatus 102, or a further auxiliary component (not shown) that carries one or more items or materials. The exterior of the mounting structure 162 may be formed as a stepped cylinder so as to have a lower larger diameter section 162A proximate to the main body 150, and an upper smaller diameter section 162B disposed above the larger diameter section. The interior of the mounting structure 162 may be hollow (as shown), or it may be solid. Other mounting structure configurations may also be used.

Figure 19:
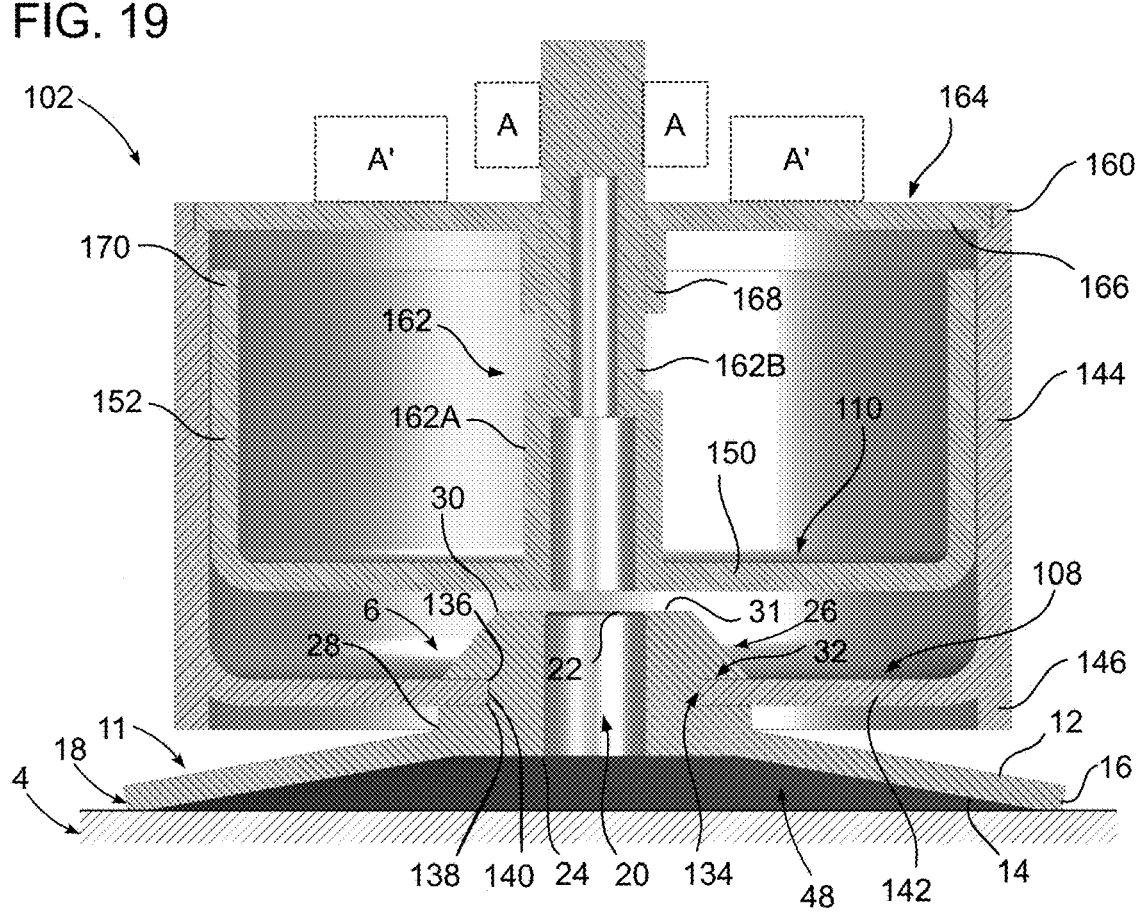
FIG. 19 is a side elevation view showing the anchoring apparatus of FIG. 16 with an open vent port.
Figure 20:
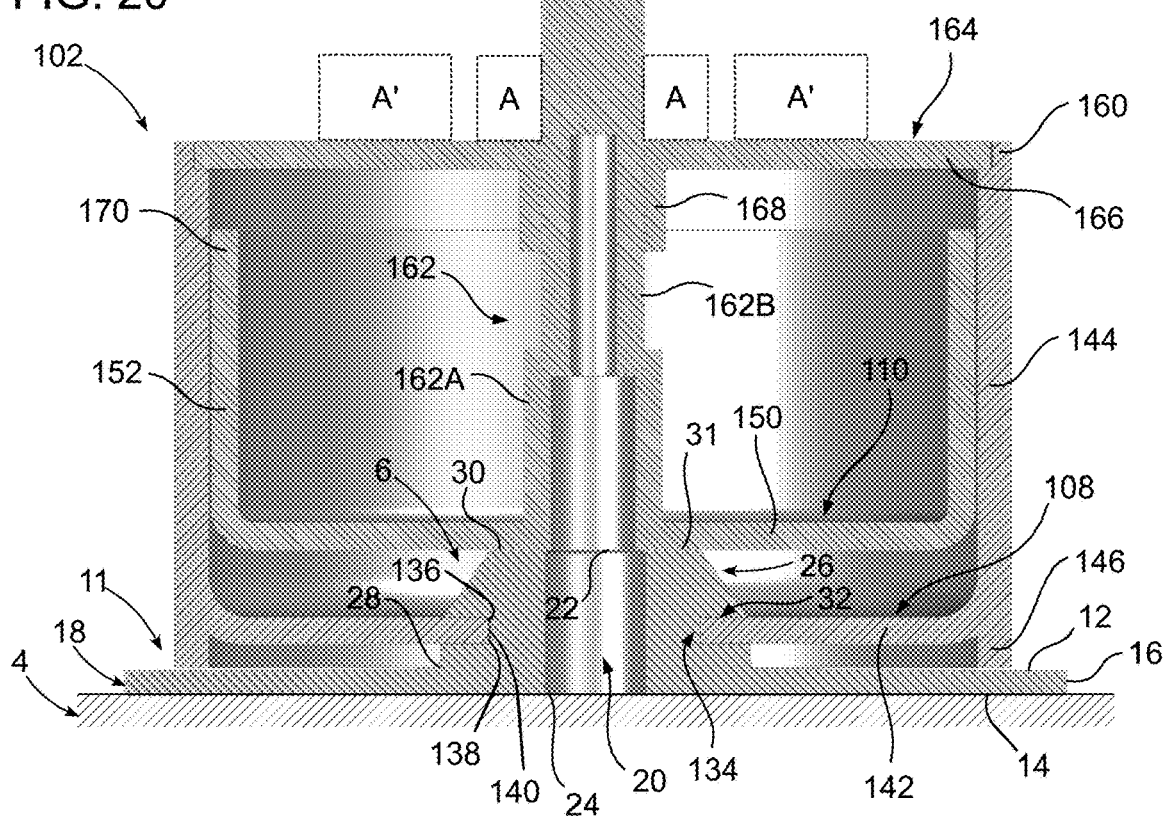
FIG. 20 is a cross-sectional centerline view showing the anchoring device of FIG. 16 with a closed vent port.
Figure 21:
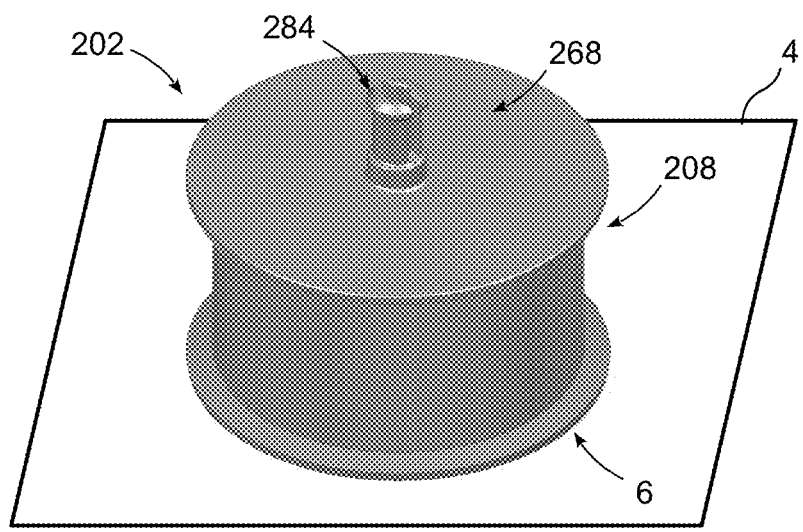
FIG. 21 is an upper perspective view showing an anchoring apparatus according to another example embodiment.
Figure 22:
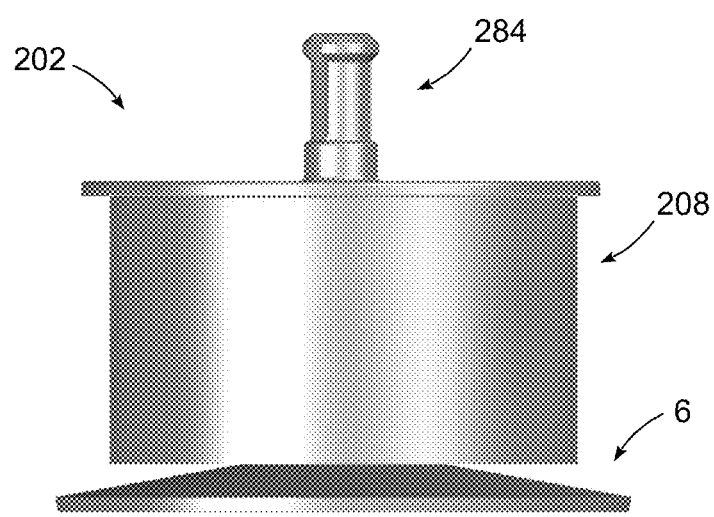
FIG. 22 is a side elevation view showing the anchoring apparatus of FIG. 21.

The anchoring apparatus 102 may further include an optional cap member 164 disposed on the upper edge 160 of the secondary body 144 of the first auxiliary component 108. The cap member 164 may be thought of as forming part of the first auxiliary component 108. As shown in FIGS. 19-20, the cap member 164 may be include a main body 166 and a central secondary body 168. In the illustrated embodiment, the main body 166 covers the opening formed by the upper edge 160 of the secondary body 144 of the first auxiliary component 108. The main body 166 may be formed as a circular disk-like structure whose peripheral edge is connected to the upper edge 160. This connection may be permanent, or it may be non-permanent (e.g., a snap-in connection) so as to allow for disassembly of the anchoring apparatus 102 and/or optional use/non-use of the cap member 164. The substantially planar configuration of the main body 166 provides a surface for carrying one or more items or materials "A'," thereby allowing the cap member 164 (and by extension the first auxiliary component 108 to which it is attached) to function as an item or material carrier (in addition to or in lieu of the second auxiliary component 110). Non-planar configurations may also be used for the main body 166. The secondary body 152 of the second auxiliary component 110 may be sized so that its upper edge 170 is spaced a short distance below the main body 166 of the cap member 164. In this way, the main body 166 may serve as a stop connection that limits upward movement of the second auxiliary component 110 so as to prevent disassembly of the anchoring apparatus 102 during normal use.

The secondary body 168 of the cap member 164 may be disposed proximate to the radial center of the main body 166, in substantial axial alignment with the mounting structure 162. In the illustrated embodiment of FIGS. 16-20, the secondary body 168 is formed as a downwardly-extending tubular sleeve that is configured to slidably receive the upper section 162B of the mounting structure 162. The mounting structure 162 may extend through the sleeve 168 and terminate at a location above the main body 166. The bore of the sleeve 168 may be sized to accommodate the smaller diameter of the upper section 162B of the mounting structure 162, but block passage of the larger diameter lower section 162A. This allows the bottom of the sleeve 168 to optionally function as a stop connection that limits upward travel of the second auxiliary component 110.

It will be seen that the anchoring apparatus 102 may be implemented as a three-component assembly whose components include the anchor member 6, the first auxiliary component 108 (which may include the cap member 164), and the second auxiliary component 110. When the anchoring apparatus 102 is resting on the support surface 4 in the manner shown in FIG. 20, a user can grasp the exposed upper end of mounting structure 162, or an additional structure mounted thereto (not shown), and lift the anchoring apparatus upwardly in a normal manner. Doing so will lift the second auxiliary component 110 off the stem landing zone 31 and thereby vent the controlled pressure zone 48. As a result, the anchoring apparatus 102 may then be lifted away from the reference surface 4 without any apparent resistance above and beyond the weight of the anchoring apparatus and the items or materials "A" and "A'" being carried. If, on the other hand, the anchoring apparatus 102 is resting on the reference surface 4 in the manner shown in FIG. 20 and is impacted by a side load that would otherwise tip the anchoring apparatus and dislodge or spill the items or materials "A" or "A'," the vent port 20 will remain closed so long as the stem landing zone 31 is engaged by the main body 150 of the second auxiliary component 110, and the anchoring apparatus will not tip due to a negative pressure differential having developed in the controlled pressure zone 48.

Turning now to FIGS. 21-26, an alternative anchoring apparatus 202 is shown that is similar to the anchoring apparatus 2 of FIGS. 1-10, and uses the same anchor member 6, but has auxiliary components constructed in a particular manner according to an intended use of the anchoring apparatus. Correspondence between components of the embodiment of FIGS. 21-26 and like components of the embodiment of FIGS. 1-10 is indicated by using corresponding reference numbers incremented by 200.

Figure 25:
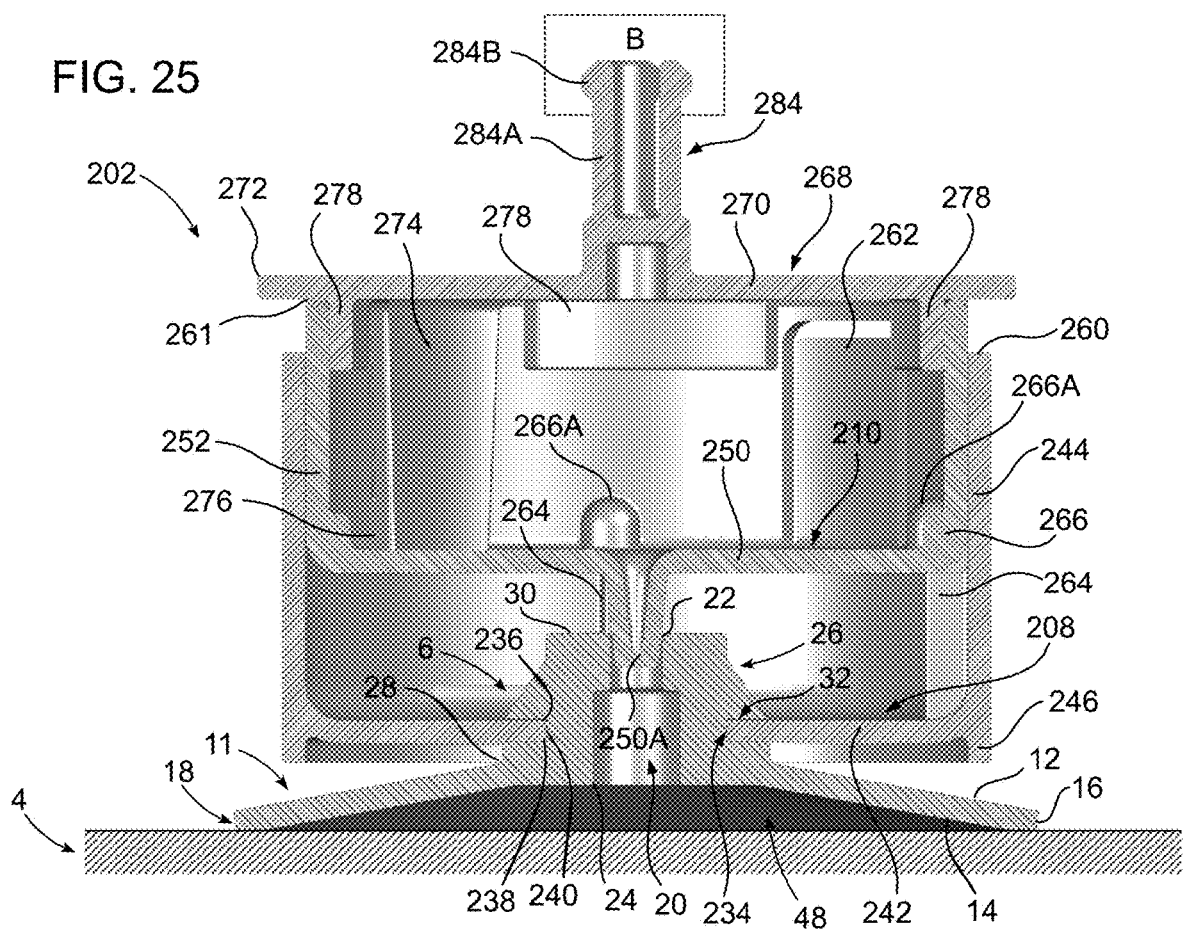
FIG. 25 is a side elevation view showing the anchoring apparatus of FIG. 21 with an open vent port.
Figure 26:
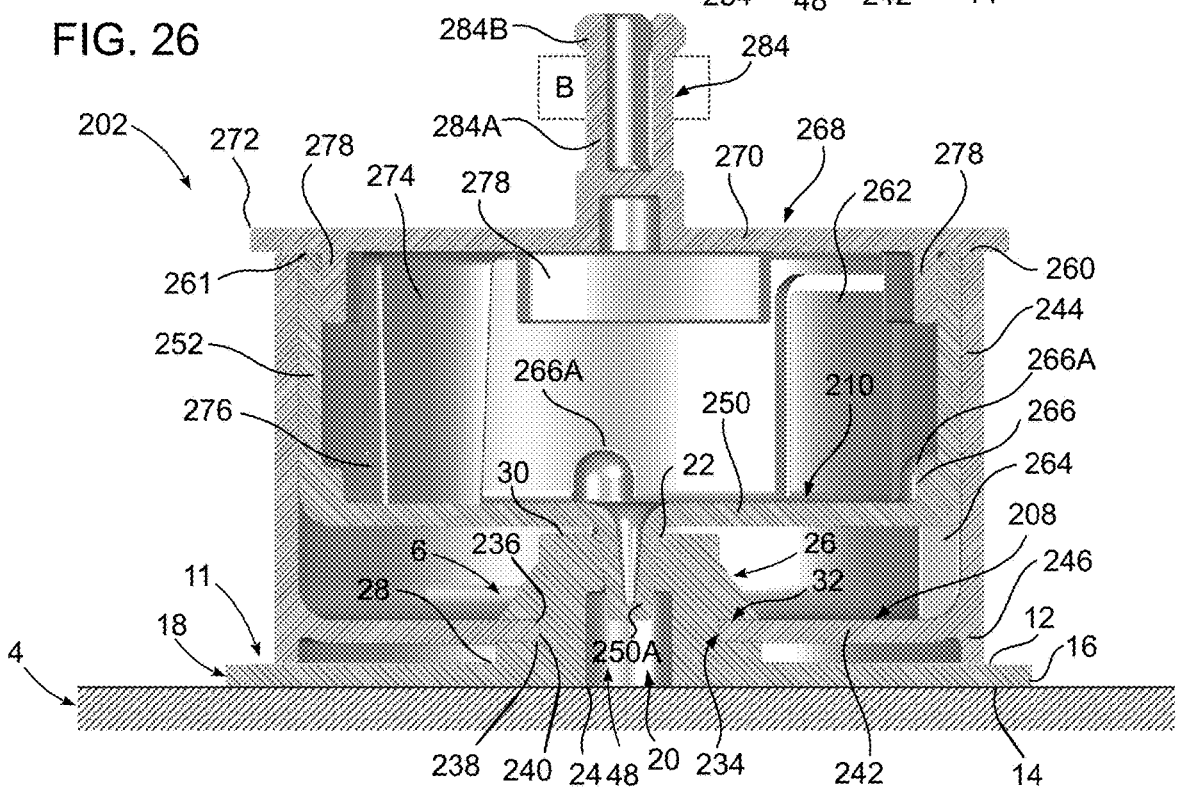
FIG. 26 is a cross-sectional centerline view showing the anchoring apparatus of FIG. 21 with a closed vent port.

FIGS. 21-24 illustrate an arrangement of the major structures of the anchoring apparatus 202. In the anchoring apparatus 202, a first auxiliary component 208 may include a circular disk-like main body 242 rigidly self-mounted to the anchor member stem 26 of the anchor member 6. A tube-like secondary body 244 of the first auxiliary component 108 may extend upwardly from the periphery of the main body 242 to an upper edge 260 that may be circular in shape. As additionally shown in FIGS. 25-26, a tube-like tertiary body 246 of the first auxiliary component 208 may extend downwardly from the periphery of the main body 242 to help stabilize the anchoring apparatus 202 on the reference surface 4. A second auxiliary component 210 may include a circular disk-like main body 250. A tube-like secondary body 252 of the second auxiliary component 210 may extend upwardly from the periphery of the main body to an upper edge 261 that may be circular in shape. A central portion of the main body 250 may be formed with a central downwardly-extending tapered plug protrusion 250A that engages the upper end 22 of the vent port 20. The tapered plug protrusion 250A may be conical in shape, having a maximum diameter at its upper base end and a minimum diameter at its lower free end. In the illustrated embodiment, the upper base end of the tapered plug protrusion 250A is larger in diameter than of the vent port 20 at its upper end 22, whereas the lower free end of the tapered plug projection is smaller than the vent port diameter. As can be seen in FIG. 26, when the tapered plug protrusion 250A is inserted far enough into the vent port 20, the plug protrusion's tapered outer surface will engage the side wall of the vent port upper end 22 at an intermediate location on the outer surface somewhere between the plug protrusion's upper base end and its lower free end. This engagement will block and seal the vent port 20 in an highly effective manner.

As best shown in FIGS. 23-24, the secondary body 252 of the second auxiliary component 210 may be formed with one or more flexible free-standing prongs 262 (two are shown) that extend upwardly from the periphery of the main body 250 to free-ends thereof that may be located proximate to the secondary body's upper edge 261. The outside surface of the prongs 262 may be formed with outwardly-extending tabs 252A. As best shown in FIG. 23, the inside wall of the first auxiliary component's secondary body 244 may be formed with elongated slots 244A (one of two are shown) that slidably receive the tabs 252A. This arrangement provides a slidable connection between the first auxiliary component 208 and the second auxiliary component 210, allowing the latter to move vertically from its closed position to its open position before the tabs 252A engage the upper end of the slots 244A and prevent further upward movement. Advantageously, if it is desired to separate the second auxiliary component 210 from the first auxiliary component 208 (e.g., for cleaning), the prongs 262 can be flexed inwardly so that the tabs 252A are forced out of engagement with the slots 244A.

The slidable connection between the first auxiliary component 208 and the second auxiliary component 210 may enhanced by providing guides that control the vertical path of the second auxiliary component. As shown in FIGS. 23, 25 and 26, the first auxiliary component 208 may be formed with one or more vertically-oriented fins 264 (one of four are shown) that project radially inwardly from the inside wall of the secondary body 244. As shown in FIGS. 23-26, the second auxiliary component 210 may be formed with one or more vertically-oriented slots 266 (four are shown in FIG. 24) that slidably engage the fins 264. The slots 266 may be formed at the intersection of the main body 250 and the secondary body 252 of the second auxiliary component 210. Each of the slots 266 may have a closed upper end 266A that engages the upper end of the corresponding fin 264 engaged by the slot. The upper ends of the fins 264 provide one or more lower stops for the second auxiliary component 210 that defines the location of the component's lower position.

As shown in FIG. 26, the lower position of the second auxiliary component 210 may be characterized by the main body 250 thereof being spaced above the stem upper end 30 of the anchor member 6, and with the tapered plug protrusion 250A extending into the vent port upper end 22 to seal the vent port 20. In this embodiment, the vent port upper end 22 functions as a landing zone for the second auxiliary component 210, with upper ends of the fins 264 acting as stops to prevent over-penetration of the tapered plug protrusion 250A into the vent port 20. The height of the fins 264 may be selected so that the lower position of the second auxiliary component 210 results in the tapered plug protrusion 250A penetrating far enough into the vent port 20 to form an airtight seal with the sides of the vent port, but without the tapered plug projection penetrating so far as to become jammed.

The second auxiliary component 210, and particularly the secondary body 252, may carry a cap member 268. Like the first and second auxiliary components 208 and 210, the cap member 268 may be formed from any suitable rigid (or semi-rigid) material, such as plastic, silicone rubber, etc. The cap member 268 includes a main body 270 that may be formed as a circular disk-like structure having a peripheral edge 272 (see FIGS. 25-26). Inboard of the peripheral edge 272, the main body 270 contacts (e.g., rests on) the upper edge 261 of the second auxiliary component's secondary body 252. As best shown in FIGS. 23-24, the cap member 268 may be formed with one or more prongs 274 (two are shown) that extend downwardly from the lower surface of the main body 270. The lower free-ends of the prongs 274 may be formed with outwardly-extending tabs 274A. Each of the one or more tabs 274A engages a slot 276 (two are shown) formed on the second auxiliary component 210 at the inside corner defined by intersection of the main body 250 and the secondary body 252. This arrangement provides an interconnection between the second auxiliary component 210 and the cap member 268. Advantageously, if it is desired to separate the cap member 268 from the second auxiliary component 210 (e.g., for cleaning), the prongs 274 can be flexed inwardly so that the tabs 274A are forced out of engagement with the slots 276.

As can be seen in each of FIGS. 23-26, the main body 270 of the cap member 268 may be formed with one or more tabs 278 (four are shown) that are spaced radially inwardly from the main body's peripheral edge 272. The one or more tabs 278 may extend downwardly along the inside wall of the secondary body 252 of the second auxiliary component 210. As shown in FIGS. 23-24, some or all of the tabs 278 may be formed with vertical fins 280 extending radially outwardly therefrom. The fins 280 engage vertical slots 282 (one of four is shown) formed on the inside wall of the second auxiliary component's secondary body 252. This arrangement helps orient the prongs 274 when mounting the cap member 268 is attached to the second auxiliary component 210.

As can be seen in each of FIGS. 21-26, the cap member 268 may be formed with a mounting structure 284 that extends upwardly from the main body 270. The mounting structure 284 is configured for mounting different attachments that may be used to carry various items or materials "B" to be secured to the reference surface 4. This allows the cap member 268 to function as a universal carrier for any number of different attachments. By extension, the second auxiliary component 210 (to which the cap member 268 is mounted) will also function as an item or material carrier (in addition to or in lieu of the first auxiliary component 208).

In the illustrated embodiment of FIGS. 21-26, the mounting structure 284 is formed as a male connector with two closely-spaced vertical prongs 284A of hemispherical cross-section, each having a radially outwardly-extending flange 284B on its free end. In lieu of this mounting structure configuration, other types of mounting structures could also be used. Attachments to be connected to the mounting structure 284 may be formed with counterpart female connectors. FIG. 27 depicts one example attachment 286 that may be used to carry a smartphone "S." The smartphone carrier attachment 286 may have a disk-shaped phone-support base 286A with one or more carrier structures 286B on its upper surface that are spaced apart to receive the base of the smartphone "S" in different angular orientations. A back support member 286C extends upwardly from the phone-support base 286A to receive the back of the smartphone "S." A tubular female connector 286D extends downwardly from the phone-support base 286A for connecting to the mounting structure 284 of the cap member 268. To facilitate fine-grained angular positioning of the smartphone "S," the mounting structure 284 and the smartphone carrier attachment 286 may be designed so that the female connector 286D of the carrier attachment can be freely rotated on the mounting structure 284 of the cap member 268.

It will be appreciated that many other types of attachments could be connected to the cap member's mounting structure 284. For example, attachments could be designed for holding kitchen, bath or other household items, workshop tools, and so on. Liquid holding attachments could also be used. FIG. 28 is illustrative. This embodiment shows an attachment 288 that may be used to hold a liquid-carrying bottle, such as a bottle of nail polish (not shown). The bottle-holding attachment 288 includes bottle receptacle 288A and a lower female mounting structure 288B that extends downwardly from the bottle receptacle for connecting to the mounting structure 284 of the cap member 268. The bottle receptacle 288 may include a plurality of resilient flaps 288C that engage and stabilize a bottle when it is inserted into the bottle receptacle. The attachment 288 may further include a pair of finger gripping tabs 288D that may be grasped by a user in order to lift the anchoring apparatus 202 from the reference surface 4.

It will be further appreciated that in lieu configuring the cap member 268 as a universal carrier equipped with a mounting structure for securing different types of attachments (e.g., the smartphone carrier 286 or the bottle holder 288), multiple versions of the cap member 268 could be provided, with each such component being configured as different type of attachment. FIG. 29 depicts an anchoring apparatus 202A having an alternative cap member 268A configured as a dedicated carrier for a specific end use instead of a universal carrier for mounting separate attachments. In this embodiment, the cap member 268A is formed with carrier structures 290 that engage and support the base of a smartphone "S" in different angular orientations. In this embodiment, the cap member 268A also includes a pen/pencil holder 292. FIG. 30 depicts another anchoring apparatus 202B having an alternative cap member 268B configured as a cup-shaped carrier dedicated to holding one or more pens, pencils or other writing implements (not shown). The cap member 268B includes an open-top, closed-bottom cup 294 for carrying the one or more writing implements.

Returning now to FIGS. 21-25, it will be seen that the anchoring apparatus 202 may be implemented as a three-component assembly whose components include the anchor member 6, the first auxiliary component 208, and the second auxiliary component 210 (which includes the cap member 268). When the anchoring apparatus 202 is resting on the support surface 4 in the manner shown in FIG. 26, a user can grasp an attachment connected to the mounting structure 284 (or the mounting structure itself if no attachment is connected thereto) and lift the anchoring apparatus upwardly in a normal manner. Doing so will lift the second auxiliary component 210 to disengage the tapered plug projection 250A from the vent port 20 and thereby vent the controlled pressure zone 48. As a result, the anchoring apparatus 202 may then be lifted away from the reference surface 4 without any apparent resistance above and beyond the weight of the anchoring apparatus and the items or materials "B" being carried. If, on the other hand, the anchoring apparatus 202 is resting on the reference surface 4 in the manner shown in FIG. 26 and is impacted by a side load that would otherwise tip the anchoring apparatus and dislodge or spill the items or materials "B," the vent port 20 will remain closed so long as the vent port 20 is engaged by the tapered plug projection 250A of the second auxiliary component 210, and the anchoring apparatus will not tip due to a negative pressure differential having developed in the controlled pressure zone 48.

Figure 25A:
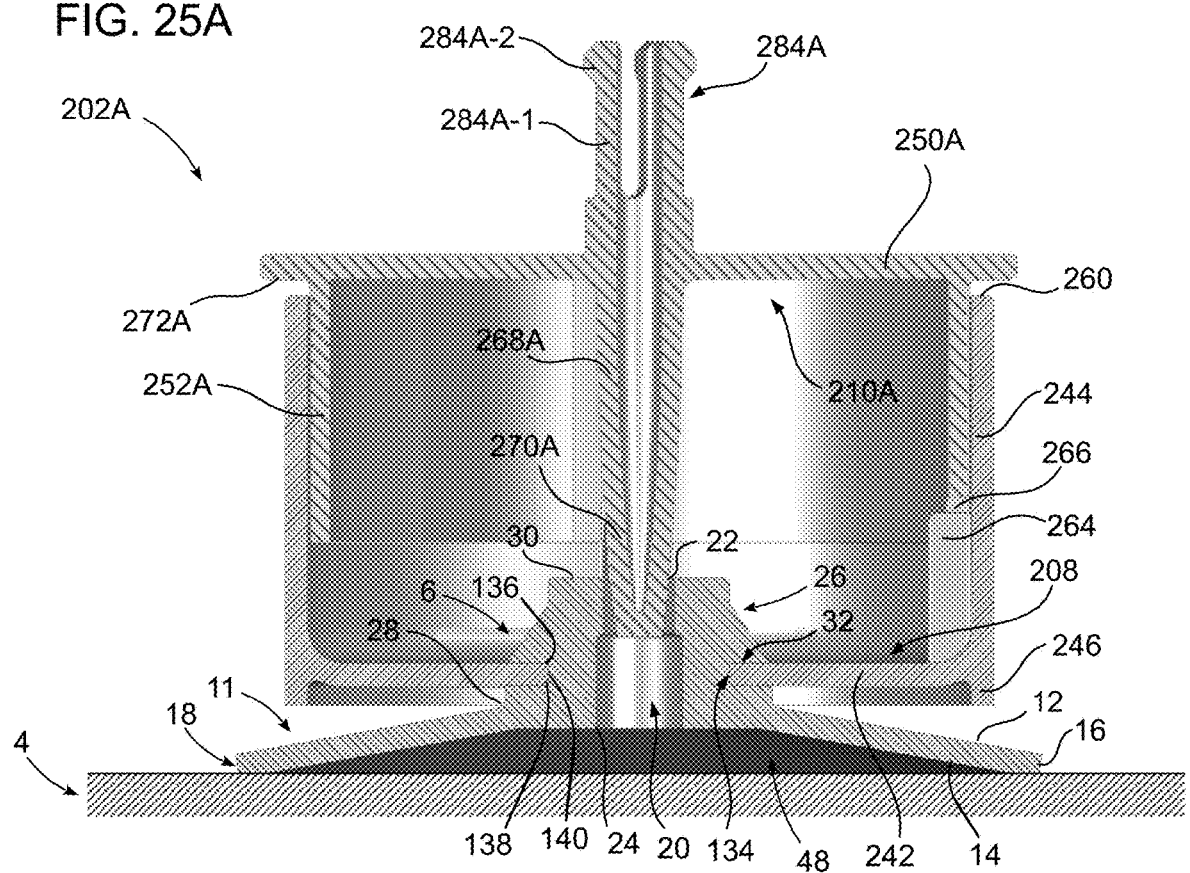
FIG. 25A is a side elevation view showing a modified version of the anchoring apparatus of FIG. 21 with an open vent port.
Figure 26A:
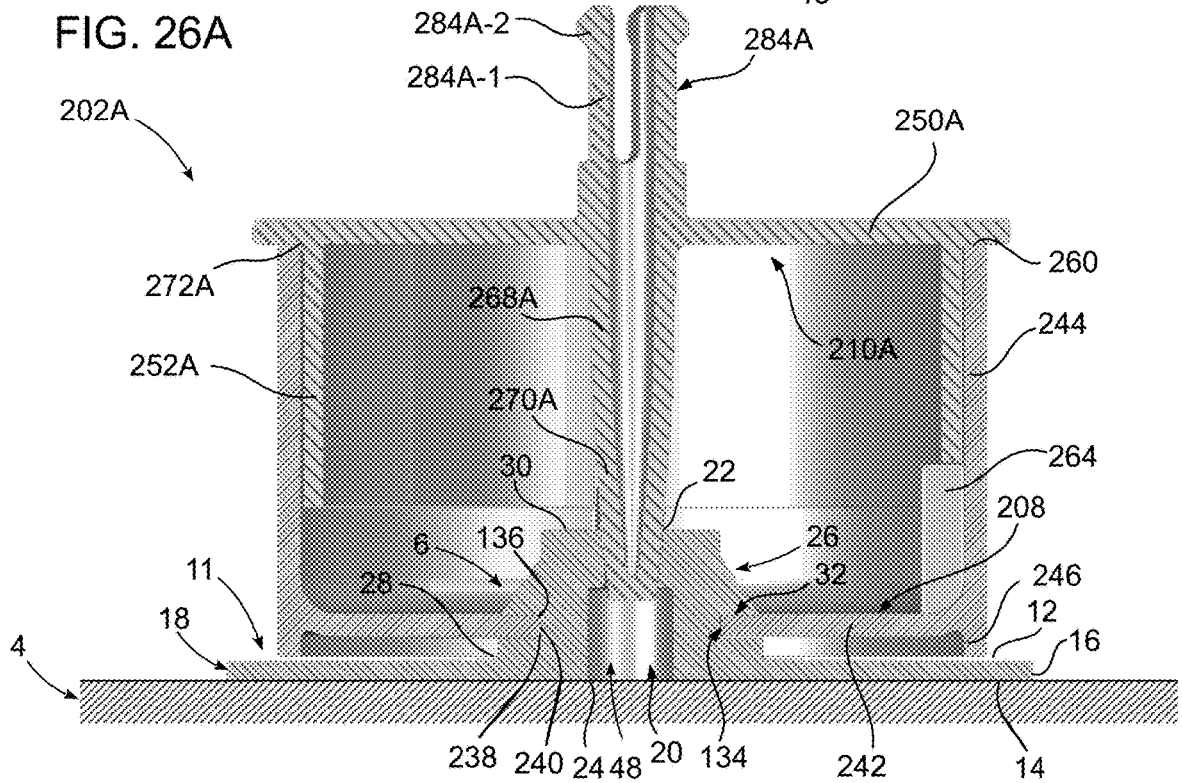
FIG. 26A is a cross-sectional centerline view showing a modified version of the anchoring apparatus of FIG. 21 with a closed vent port.

Turning now to FIGS. 25A and 26A, a modified version 202A of the anchoring apparatus 202 is shown that uses an alternative second auxiliary component 210A that differs from the second auxiliary component 210 of FIGS. 21-26. The alternative second auxiliary component 210A is vertically movable relative to the first auxiliary component 208 between a lower position and an upper position. The second auxiliary component 210A may include a circular disk-like main body 250A on which is formed a tube-like secondary body 252A. The secondary body 252A extends downwardly from the main body 250A at a location that is proximate to the main body periphery. The outside surface of the second auxiliary component's secondary body 252A may be in opposing closely spaced relationship with the inside surface of the first auxiliary component's secondary body 244 to help guide the second auxiliary component's vertical motion.

The underside of the second auxiliary component's main body 250A is formed with a non-planar stem engagement structure 268A in the form of a central elongated post protrusion that extends downwardly from the lower side of the main body. In the illustrated embodiment, the stem engagement structure 268A is cylindrical at its upper end and has a tapered tip 270A at its lower end. The stem engagement structure 268A is sized and positioned to engage the vent port 20 of the anchor member 6, the upper end 22 of which is located at the upper end 30 of the anchor member stem 26. In this embodiment, the vent port 20 is shown as being stepped inwardly so that the upper end 22 of the vent port has a smaller diameter than the lower end 24. The diameter of the lower tip end 270A of the stem engagement structure 268A may be slightly smaller than the vent port's smaller diameter upper end 22 so the tip end will insert into the vent port 20 until the tapered sidewall of the stem engagement structure (above the tip end) engages the sides of the vent port 20 to form an airtight seal. Other stem engagement structure configurations (such as a non-tapered tip) could also be used.

In order to limit the downward travel of the second auxiliary component 210A, the main body 250A of the second auxiliary component may include a peripheral lip 272A that extends radially beyond the second auxiliary component's secondary body 252A, and also beyond the secondary body 244 of the first auxiliary component 208. The peripheral lip 272A will contact the upper end 260 of the secondary body 244 when the second auxiliary component 210A reaches is lower position. This contact between the peripheral lip 272A and the upper end 260 of the secondary body 244 prevents the stem engagement structure 268A from penetrating too far into the vent port 20, which could in some situations result in the second auxiliary component 210A becoming stuck in the vent port closure position.

The main body 250A of the second auxiliary component 210A may be configured as a universal carrier that can mount any number of separate attachments, each of which is configured for holding one or more specific items. In particular, a universal mounting structure 284A may extend upwardly from the center (or other location) of the main body 250A. The universal mounting structure 284A may take the form of a male connector with two closely-spaced vertical prongs 284A-1 of hemispherical cross-section, each having a radially outwardly-extending flange 284A-2 on its free end. Many other connector designs could also be used. Attachments to be connected to the mounting structure 284A may be formed with counterpart female connectors. Attachments such as the smartphone carrier 286 of FIG. 27 and the bottle holder 288 of FIG. 28 may be used, among many others.

Figure 31:
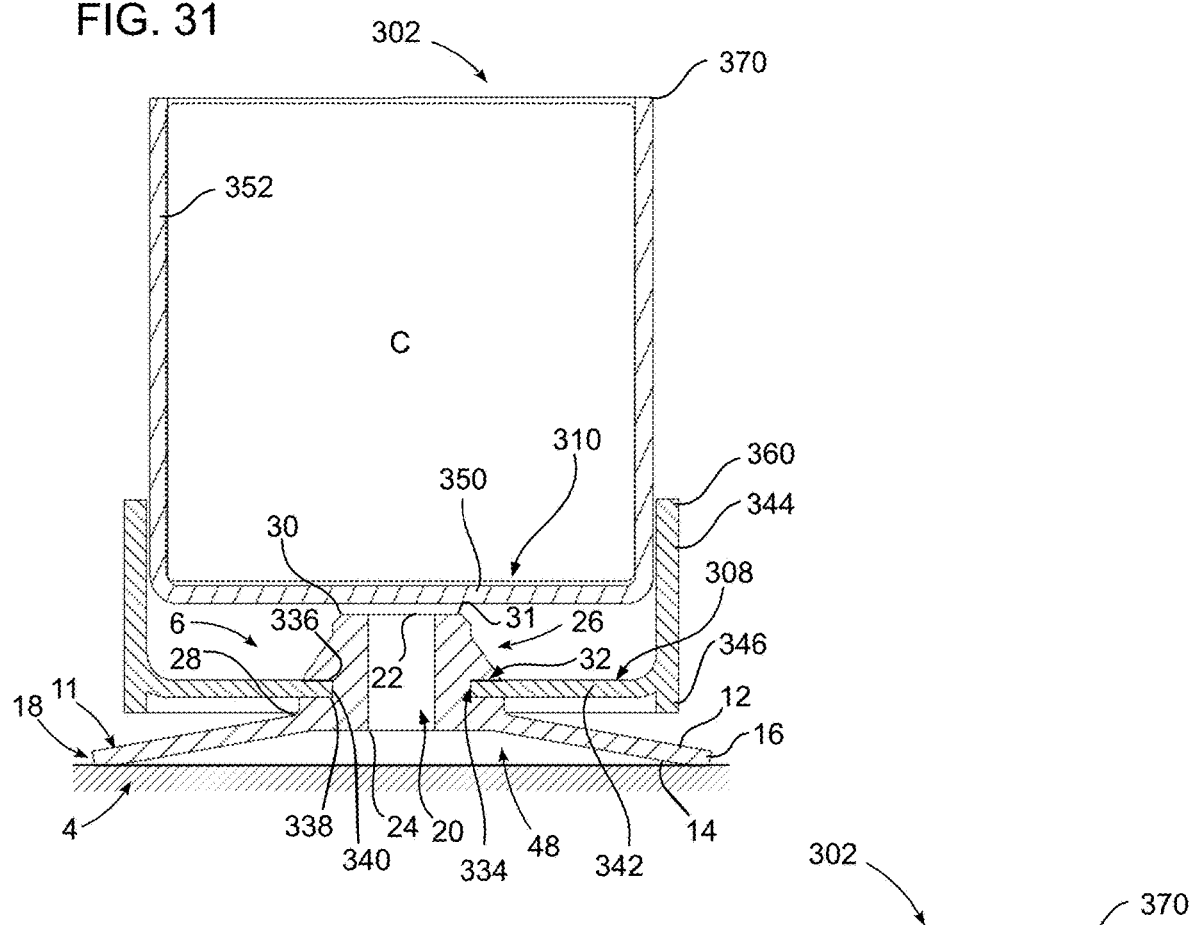
FIG. 31 is a cross-sectional centerline view showing an anchoring apparatus according to another embodiment, with an open vent port.
Figure 32:
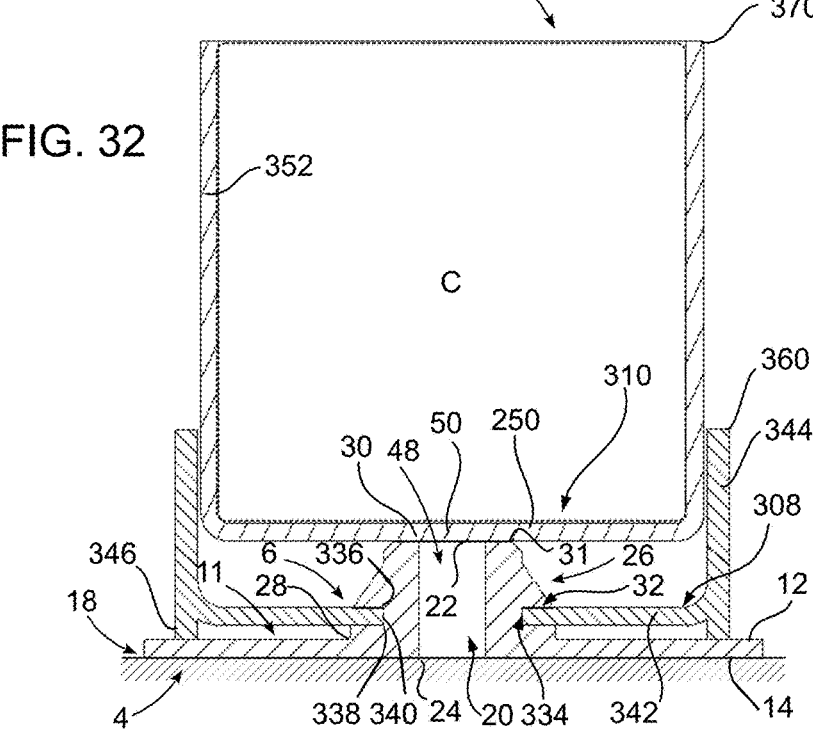
FIG. 32 is a cross-sectional centerline view showing the anchoring apparatus of FIG. 31 with a closed vent port.

Turning now to FIGS. 31-32, an alternative anchoring apparatus 302 is shown that is similar to the anchoring apparatus 2 of FIGS. 1-10, but has alternative auxiliary components constructed in a particular manner according to an intended use of the anchoring apparatus. Correspondence between components of the embodiment of FIGS. 31-32 and like components of the embodiment of FIGS. 1-10 is indicated by using corresponding reference numbers incremented by 300.

In the anchoring apparatus 302, a first auxiliary component 308 may include a circular disk-like main body 342 rigidly self-mounted to the anchor member stem 26 of the anchor member 6. A tube-like secondary body 344 of the first auxiliary component 308 may extend upwardly from the periphery of the main body 342 to an upper edge 360 that may be circular in shape. A tube-like tertiary body 346 of the first auxiliary component 308 may extend downwardly from the periphery of the main body 242 to help stabilize the anchoring apparatus 302 on the reference surface 4. A second auxiliary component 310 may include a circular disk-like main body 350. A tube-like secondary body 352 of the second auxiliary component 310 may extend upwardly from the main body 350 to an upper edge 370 that may be of circular shape.

The second auxiliary component 310 may serve as a closed-bottom, open-top vessel whose hollow interior carries a material "C," which may be a solid or a liquid. For example, the anchoring apparatus 302 may serve as a drinking vessel, with the secondary body 352 of the second auxiliary component 310 providing a grasping portion. Although not shown, the second auxiliary component 310 may be slidably connected to the first auxiliary component 308 in any suitable manner that allows the second auxiliary component to move upwardly without separating from the first auxiliary component. See, for example, FIGS. 9-10 depicting the slot-and-tab connection arrangement provided by elements 44A and 52A of the anchoring apparatus 2.

It will be seen that the anchoring apparatus 302 may be implemented as a three-component assembly whose components include the anchor member 6, the first auxiliary component 308, and the second auxiliary component 310. When the anchoring apparatus 302 is resting on the support surface 4 in the manner shown in FIG. 32, a user can grasp the secondary body 352 of the second auxiliary component 310 and lift the anchoring apparatus upwardly in a normal manner. Doing so will lift the second auxiliary component 310 off the stem landing zone 31 and thereby vent the controlled pressure zone 48. As a result, the anchoring apparatus 302 may then be lifted away from the reference surface 4 without any apparent resistance above and beyond the weight of the anchoring apparatus and the item or material "C" being carried. If, on the other hand, the anchoring apparatus 302 is resting on the reference surface 4 in the manner shown in FIG. 32 and is impacted by a side load that would otherwise tip the anchoring apparatus and dislodge or spill the item or material "C," the vent port 20 will remain closed so long as the stem landing zone 31 is engaged by the main body 350 of the second auxiliary component 310, and the anchoring apparatus will not tip due to a negative pressure differential having developed in the controlled pressure zone 48.

Turning now to FIGS. 33-34, an alternative anchoring apparatus 402 is shown that is similar to the anchoring apparatus 2 of FIGS. 1-10, but has alternative auxiliary components constructed in a particular manner according to an intended use of the anchoring apparatus. Correspondence between components of the embodiment of FIGS. 33-34 and like components of the embodiment of FIGS. 1-10 is indicated by using corresponding reference numbers incremented by 400.

In the anchoring apparatus 402, a first auxiliary component 408 may include a circular disk-like main body 442 rigidly self-mounted to the anchor member stem 26 of the anchor member 6. A tube-like secondary body 444 of the first auxiliary component 408 may extend upwardly from the periphery of the main body 442. An upper end portion of the secondary body 444 may include one or more circumferentially spaced flanges 444A that extend laterally outwardly. A tube-like tertiary body 446 of the first auxiliary component 408 may extend downwardly from the periphery of the main body 442 to help stabilize the anchoring apparatus 402 on the reference surface 4. A second auxiliary component 410 may include a circular disk-like main body 450. A tube-like secondary body 452 of the second auxiliary component 410 may extend upwardly from the periphery of the main body 408 to an upper edge 470 that may be of circular shape.

The second auxiliary component 410 may serve as a closed-bottom, open-top beverage container whose hollow interior carries a material "D," which may be a solid or a liquid. For example, the anchoring apparatus 402 may serve as a travel mug, with the secondary body 452 of the second auxiliary component 410 providing a grasping portion. In that case, the region of the second auxiliary component 410 proximate to the upper edge 470 may have threads 472 for removably attaching a lid (not shown). As also shown, the outer surface of the secondary body 452 may be ergonomically tapered for user convenience, such as by creating a bulge near the upper edge 470.

The second auxiliary component 410 may be slidably mounted to the first auxiliary component 408 by way of a tube-like tertiary body 474 that extends downwardly from the secondary body 452 below the main body 450. The secondary body 444 of the first auxiliary component 408 may be slidably nested within the tertiary body 474 of the second auxiliary component 410. A lower terminal portion of the tertiary body 474 may be formed with one or more circumferentially spaced flanges 474A that extend laterally inwardly. As shown in FIG. 33, the inwardly extending flanges 474A of the second auxiliary component's tertiary body 474 will engage the outwardly extending flanges 444A of the first auxiliary component's secondary body 444 when the second auxiliary component 410 reaches its upper position. This engagement provides a connection that prevents inadvertent separation of second auxiliary component 410 from the first auxiliary component 408 during normal use of the anchoring apparatus 402. As can be seen in both FIGS. 33 and 34, the base seal member 11 of the anchoring apparatus 402 may be nested entirely within the area defined by the periphery of the tertiary body 474 of the second auxiliary component 410, or additionally within the tertiary body 446 of the first auxiliary component 408, which facilitates compact design.

It will be seen that the anchoring apparatus 402 may be implemented as a three-component assembly whose components include the anchor member 6, the first auxiliary component 408, and the second auxiliary component 410. When the anchoring apparatus 402 is resting on the support surface 4 in the manner shown in FIG. 34, a user can grasp the secondary body 452 of the second auxiliary component 410 and lift the anchoring apparatus upwardly in a normal manner. Doing so will lift the second auxiliary component 410 off the stem landing zone 31 and thereby vent the controlled pressure zone 48. As a result, the anchoring apparatus 402 may then be lifted away from the reference surface 4 without any apparent resistance above and beyond the weight of the anchoring apparatus and the item or material "D" being carried. If, on the other hand, the anchoring apparatus 402 is resting on the reference surface 4 in the manner shown in FIG. 34 and is impacted by a side load that would otherwise tip the anchoring apparatus and dislodge or spill the item or material "D," the vent port 20 will remain closed so long as the stem landing zone 31 is engaged by the main body 450 of the second auxiliary component 410, and the anchoring apparatus will not tip due to a negative pressure differential having developed in the controlled pressure zone 48.

Turning now to FIGS. 35-36, an alternative anchoring apparatus 502 is shown that is similar to the anchoring apparatus 2 of FIGS. 1-10, but has alternative auxiliary components constructed in a particular manner according to the intended use of the anchoring apparatus. Correspondence between components of the embodiment of FIGS. 35-36 and like components of the embodiment of FIGS. 1-10 is indicated by using corresponding reference numbers incremented by 500.

In the anchoring apparatus 502, a first auxiliary component 508 may include a circular disk-like main body 542 rigidly self-mounted to the anchor member stem 26 of the anchor member 6. A tube-like secondary body 544 of the first auxiliary component 508 may extend upwardly from the periphery of the main body 542. An upper end portion of the secondary body 544 may include one or more circumferentially spaced flanges 544A that extend laterally outwardly. A tube-like tertiary body 546 of the first auxiliary component 508 may extend downwardly from the periphery of the main body 542 to help stabilize the anchoring apparatus 502 on the reference surface 4. A second auxiliary component 510 may include a circular disk-shaped main body 550. A tube-like secondary body 574 of the second auxiliary component 510 may extend downwardly from the periphery of the main body 550 to a lower end portion that may include one or more circumferentially spaced flanges 574A that extend laterally inwardly.

The secondary body 544 of the first auxiliary component 508 may be slidably nested within the secondary body 574 of the second auxiliary component 510. As shown in FIG. 35, the inwardly extending flanges 574A of the second auxiliary component's secondary body 574 will engage the outwardly extending flanges 544A of the first auxiliary component's secondary body 544 when the second auxiliary component 510 reaches its upper position. This engagement provides a connection that prevents inadvertent separation of second auxiliary component 510 from the first auxiliary component 508 during normal use of the anchoring apparatus 502. As can be seen in both FIGS. 35 and 36, the base seal member 11 of the anchoring apparatus 502 may be nested entirely within the area defined by the periphery of the secondary body 574 of the second auxiliary component 510, or additionally within the tertiary body 546 of the first auxiliary component 508, which facilitates compact design.

A third auxiliary component 576 of the anchoring apparatus 502 is mounted on the second auxiliary component 510. The third auxiliary component 576 includes a main body 578 that covers the main body 550 of the second auxiliary component 510. A secondary body 580 of the third auxiliary component 576 extends upwardly from the periphery of the main body 578 to an upper edge 582 that may be of circular shape. The third auxiliary component 576 may serve as a closed-bottom, open-top beverage container whose hollow interior carries a material "E," which may be a solid or a liquid. For example, the anchoring apparatus 502 may serve as a travel mug, with the secondary body 580 of the third auxiliary component 576 providing a grasping portion. In that case, the region of the third auxiliary component 576 proximate to the upper edge 582 may have threads 584 for removably attaching a lid (not shown). As also shown, the outer surface of the secondary body 580 may be ergonomically tapered for user convenience, such as by creating a bulge near the upper edge 582. Like the first and second auxiliary components 508 and 510, the third auxiliary component 576 may be formed of any suitable rigid (or semi-rigid) material, such as plastic, silicone rubber, etc. The third auxiliary component 576 may further include a tertiary body 586 that extends downwardly from the periphery of the main body 578 and covers the outside surface of the second auxiliary component's secondary body 574, or a portion thereof.

It will be seen that the anchoring apparatus 502 may be implemented as a four-component assembly whose components include the anchor member 6, the first auxiliary component 508, the second auxiliary component 510, and the third auxiliary component 576. When the anchoring apparatus 502 is resting on the support surface 4 in the manner shown in FIG. 36, a user can grasp the secondary body 580 of the third auxiliary component 576 and lift the anchoring apparatus 502 upwardly in a normal manner. Doing so will lift the second auxiliary component 510 off the stem landing zone 31 and thereby vent the controlled pressure zone 48. As a result, the anchoring apparatus 502 may then be lifted away from the reference surface 4 without any apparent resistance above and beyond the weight of the anchoring apparatus and the item or material "E" being carried. If, on the other hand, the anchoring apparatus 502 is resting on the reference surface 4 in the manner shown in FIG. 36 and is impacted by a side load that would otherwise tip the anchoring apparatus and dislodge or spill the item or material "E," the vent port 20 will remain closed so long as the stem landing zone 31 is engaged by the main body 550 of the second auxiliary component 510, and the anchoring apparatus will not tip due to a negative pressure differential having developed in the controlled pressure zone 48.

Turning now to FIGS. 37-38, an alternative anchoring apparatus 602 is shown that is similar to the anchoring apparatus 2 of FIGS. 1-10, but has alternative auxiliary components constructed in a particular manner according to the intended use of the anchoring apparatus. Correspondence between components of the embodiment of FIGS. 37-38 and like components of the embodiment of FIGS. 1-10 is indicated by using corresponding reference numbers incremented by 600.

In the anchoring apparatus 602, a first auxiliary component 608 may include a circular disk-like main body 642 rigidly self-mounted to the anchor member stem 26 of the anchor member 6. A tube-like secondary body 644 of the first auxiliary component 608 may extend upwardly from the periphery of the main body 642. An upper end portion of the secondary body 644 may include one or more circumferentially spaced flanges 644A that extend laterally inwardly. A tube-like tertiary body 646 of the first auxiliary component 608 may extend downwardly from the periphery of the main body 642 to help stabilize the anchoring apparatus 602 on the reference surface 4. A second auxiliary component 610 may include a circular disk-like main body 650. A tube-like secondary body 674 may extend downwardly from the periphery of the main body 610 to a lower end portion that may include one or more circumferentially spaced flanges 674A that extend laterally outwardly. The secondary body 674 of the second auxiliary component 610 may be slidably nested within the secondary body 644 of the first auxiliary component 608. As shown in FIG. 37, the outwardly extending flanges 674A of the second auxiliary component's secondary body 674 will engage the inwardly extending flanges 644A of the first auxiliary component's secondary body 644 when the second auxiliary component 610 reaches its upper position. This engagement will prevent inadvertent separation of second auxiliary component 610 from the first auxiliary component 608 during normal use of the anchoring apparatus 602. As can be seen in both FIGS. 37 and 38, the base seal member 11 of the anchoring apparatus 2 may be nested entirely within the area defined by the periphery of the tertiary body 646 that extends downwardly from the periphery of the first auxiliary component's main body 612, which facilitates compact design.

A third auxiliary component 676 of the anchoring apparatus 602 is mounted on the second auxiliary component 610. The third auxiliary component 676 includes a main body 678 that covers the main body 650 of the second auxiliary component 610. A secondary body 680 of the third auxiliary component 676 extends upwardly from the periphery of the main body 678 to an upper edge 682 that may be of circular shape. The third auxiliary component 676 may serve as a closed-bottom, open-top beverage container whose hollow interior carries a material "F," which may be a solid or a liquid. For example, the anchoring apparatus 602 may serve as a travel mug, with the secondary body 680 of the third auxiliary component 676 providing a grasping portion. In that case, the area of the third auxiliary component 676 proximate to the upper edge 682 may have threads 684 for removably attaching a lid (not shown). As also shown, the outer surface of the secondary body 680 may be ergonomically tapered for user convenience, such as by creating a bulge near the upper edge 682. Like the first and second auxiliary components 608 and 610, the third auxiliary component 676 may be formed of any suitable rigid (or semi-rigid) material, such as plastic, silicone rubber, etc.

It will be seen that the anchoring apparatus 602 may be implemented as a four-component assembly whose components include the anchor member 2, the first auxiliary component 608, the second auxiliary component 610, and the third auxiliary component 676. When the anchoring apparatus 602 is resting on the support surface 4 in the manner shown in FIG. 38, a user can grasp the secondary body 680 of the third auxiliary component 676 and lift the anchoring apparatus 602 upwardly in a normal manner. Doing so will lift the second auxiliary component 610 off the stem landing zone 31 and thereby vent the controlled pressure zone 48. As a result, the anchoring apparatus 602 may then be lifted away from the reference surface 4 without any apparent resistance above and beyond the weight of the anchoring apparatus and the item or material "F" being carried. If, on the other hand, the anchoring apparatus 602 is resting on the reference surface 4 in the manner shown in FIG. 38 and is impacted by a side load that would otherwise tip the anchoring apparatus and dislodge or spill the item or material "F," the vent port 20 will remain closed so long as the stem landing zone 31 is engaged by the main body 650 of the second auxiliary component 610, and the anchoring apparatus will not tip due to a negative pressure differential having developed in the controlled pressure zone 48.

It will be appreciated that the various anchoring apparatus described above in connection with FIGS. 1-38 could be embodied in many other shapes and sizes to provide different types of carriers, holders and containers, including but not limited to bowls, buckets, cans, vases, urns, tanks, or any other receptacle apparatus whose function is to hold various types of spillable contents, such as liquids, semi-liquids, solids or semi-solids. The anchoring apparatus could also function to hold a separate carrier, holder or container, such as a can or bottle anchoring apparatus that holds a beverage can or bottle.

Accordingly, a quick-release anchoring apparatus has been disclosed. Reference in the present disclosure to an "embodiment" means that a particular feature, structure or characteristic described in connection with the embodiment may be included in at least one embodiment of the disclosed device. Thus, the appearances of the term "embodiment" in various places throughout the specification are not necessarily all referring to the same embodiment.

For purposes of explanation, specific configurations and details have been set forth herein in order to provide a thorough understanding of the present invention. However, it will be apparent to one of ordinary skill in the art that embodiments of the present invention may be practiced without the specific details presented herein. Furthermore, well-known features may have been omitted or simplified in order not to obscure the present invention. Various examples may be given throughout this description. These examples are merely descriptions of specific embodiments of the invention. The scope of the invention is not limited to the examples given.

As used in this application, the terms such as "upper," "lower," "top," "bottom," "vertical," "vertically," "lateral," "laterally," "inner," "outer," "outward," "inward," "front," "frontward," "forward," "rear," "rearward," "upwardly," "downwardly," "inside," "outside," "interior," "exterior," and other orientational descriptors are intended to facilitate the description of the example embodiments of the present disclosure, and are not intended to limit the structure of the example embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments. Terms of rough approximation, such as "generally," are understood by those of ordinary skill to refer to a characteristic or feature of that bears resemblance to something, such that it is reasonable to draw a comparison to facilitate understanding, without requiring that the characteristic or feature be exactly the same, or even substantially the same, as the thing to which it is compared.

Although example embodiments have been shown and described, it should be apparent that many variations and alternative embodiments could be implemented in accordance with the present disclosure. It is understood, therefore, that the invention is not to be in any way limited except in accordance with the spirit of the appended claims and their equivalents.

What is claimed is:

1. A quick-release anchoring apparatus, comprising:
   an anchor member comprising a non-porous resilient material;
   the anchor member comprising a flexible base seal member having a seal member first side, a seal member second side, and a seal member peripheral edge defining an outer periphery of the seal member first side and the seal member second side;
   the seal member second side being configured to engage a surface and form a substantially airtight seal therewith that defines a controlled pressure zone, the controlled pressure zone comprising a region located between the seal member second side and the surface;
   the anchor member further comprising a central anchor member stem having a stem first end disposed on the seal member first side and a stem second end;
   a first auxiliary component comprising a first auxiliary component main body extending outwardly from the anchor member stem and having a central opening through which the anchor member stem extends, the first auxiliary component further comprising a first auxiliary component secondary body extending from the first auxiliary component main body;
   the anchor member being rigidly mounted to the first auxiliary component main body without the use of discrete retainers or fasteners;
   a vent port extending through the anchor member;
   the vent port having a first end disposed on the seal member second side in fluid communication with the controlled pressure zone and a second end disposed on the stem second end in fluid communication with an area of ambient pressure;
   the vent port second end being within a stem landing zone on the stem second end;
   a second auxiliary component slidably mounted to the first auxiliary component to facilitate a first position and a second position of the second auxiliary component relative to the first auxiliary component, the second auxiliary component and the first auxiliary component being discrete components formed independently of each other;
   the second auxiliary component comprising a second auxiliary component sidewall that slidably engages the first auxiliary component secondary body in a manner that minimizes lateral mobility and rotational capability of the second auxiliary component relative to its direction of movement and thereby allows the first auxiliary component to guide the path of the second auxiliary component as it moves between its first and second positions;

the first position of the second auxiliary component comprising a vent port closure position wherein the second auxiliary component directly engages the stem landing zone and blocks the vent port to prevent the passage of air therethrough, such that the controlled pressure zone is rendered airtight and the base seal member will resist movement of the anchoring apparatus away from the surface when the base seal member is flexed in a manner that increases the volume of the controlled pressure zone and decreases the air pressure therein; and the second position of the second auxiliary component comprising a vent port open position wherein the second auxiliary component disengages from the stem landing zone and unblocks the vent port to allow the passage of air therethrough, such that the controlled pressure zone is vented to the area of ambient pressure and the base seal member will not resist movement of the anchoring apparatus away from the surface.

2. The apparatus of claim 1, wherein the second auxiliary component comprises a second auxiliary component main body that engages the stem landing zone and a second auxiliary component secondary body that extends from the second auxiliary component main body and provides the second auxiliary component sidewall that slidably engages the first auxiliary component secondary body.

3. The apparatus of claim 2, wherein the second auxiliary component sidewall comprises a region of the second auxiliary component secondary body that engages the first auxiliary component secondary body proximate to the second auxiliary component main body.

4. The apparatus of claim 2, wherein the second auxiliary component sidewall that engages the first auxiliary component secondary body comprises substantially all of the second auxiliary component secondary body.

5. The apparatus of claim 2, further comprising an interconnection between the first auxiliary component and the second auxiliary component that limits the movement of the second auxiliary component relative to the first auxiliary component.

6. The apparatus of claim 5, wherein the second auxiliary component sidewall that engages the first auxiliary component secondary body comprises a region of the second auxiliary component secondary body that extends from the second auxiliary component main body to a portion of the second auxiliary component secondary body that forms part of the interconnection.

7. The apparatus of claim 1, wherein the first auxiliary component secondary body is disposed proximate to the outer periphery of the anchor member seal member.

8. The apparatus of claim 1, wherein the first auxiliary component main body and the first auxiliary component secondary body are formed as an integrated structure.

9. The apparatus of claim 1, wherein the first auxiliary component or the second auxiliary component comprises a carrier configured to carry an item or material.

10. The apparatus of claim 9, wherein the carrier is configured to rotatably carry an item or material.

11. The apparatus of claim 9, wherein the carrier is configured to mount one or more attachments.

12. The apparatus of claim 9, wherein the carrier is configured to rotatably mount one or more attachments.

13. The apparatus of claim 9, wherein the carrier is configured as a universal carrier that is operable to mount one or more carrier attachments of different type that carry items or materials of different type.

14. The apparatus of claim 13, wherein the universal carrier is configured for rotatable attachment to the one or more attachments such that the one or more attachments can rotate with respect to the anchoring apparatus.

15. The apparatus of claim 14, in combination with a smartphone carrier attachment rotatably mounted to the universal carrier.

16. The apparatus of claim 15, wherein the smartphone carrier attachment comprises a phone support base and a back support member, the phone support base being configured to receive a base edge of a smartphone and the back support member being configured to receive a back of the smartphone.

17. The apparatus of claim 1, wherein the apparatus comprises a carrier, holder or container configured to carry, hold or contain an item or material.

18. The anchoring apparatus of claim 1, wherein the anchoring apparatus comprises a carrier, holder or container attachment configured to carry, hold or contain an item or material.

19. A quick-release anchoring apparatus, comprising:
an anchor member comprising a non-porous resilient material;
the anchor member comprising a flexible base seal member having a seal member first side, a seal member second side, and a seal member peripheral edge defining an outer periphery of the seal member first side and the seal member second side;
the seal member second side being configured to engage a surface and form a substantially airtight seal therewith that defines a controlled pressure zone, the controlled pressure zone comprising a region located between the seal member second side and the surface;
the anchor member further comprising a central anchor member stem having a stem first end disposed on the seal member first side and a stem second end;
a first auxiliary component;
the anchor member being rigidly mounted to the first auxiliary component with the entire seal member second side arranged to engage the surface when the substantially airtight seal is formed;
a vent port extending through the seal member between the seal member first side and the seal member second side;
the vent port having a first end disposed on the seal member second side in fluid communication with the controlled pressure zone and a second end disposed on the stem second end in fluid communication with an area of ambient pressure;
the vent port second end being within a stem landing zone on the stem second end;
a second auxiliary component slidably mounted to the first auxiliary component to facilitate a first position and a second position of the second auxiliary component relative to the first auxiliary component, the second auxiliary component and the first auxiliary component being discrete components formed independently of each other;
the first position of the second auxiliary component comprising a vent port closure position wherein the second auxiliary component directly engages the stem landing zone and blocks the vent port to prevent the passage of air therethrough, such that the controlled pressure zone is rendered airtight and the base seal member will resist movement of the anchoring apparatus away from the surface when the base seal member is flexed in a manner that increases the volume of the controlled pressure zone and decreases the air pressure therein; and the second position of the second auxiliary component comprising a vent port open position wherein the second auxiliary component is disengaged from the stem landing zone and unblocks the vent port to allow the passage of air therethrough, such that the controlled pressure zone is vented to the area of ambient pressure and the base seal member will not resist movement of the anchoring apparatus away from the surface.

20. A quick-release anchoring apparatus, comprising:

a three-component assembly operable to controllably adhere to and release from a surface using only an anchor member, a first auxiliary component, and a second auxiliary component;

the anchor member comprising a non-porous resilient material;

the anchor member comprising a flexible base seal member having a seal member first side, a seal member second side, and a seal member peripheral edge defining an outer periphery of the seal member first side and the seal member second side;

the seal member first side being configured to engage a surface and form a substantially airtight seal therewith that defines a controlled pressure zone, the controlled pressure zone comprising a region located between the seal member second side and the surface;

the anchor member further comprising a central anchor member stem having a stem first end disposed on the seal member first side and a stem second end;

the first auxiliary component comprising a first auxiliary component main body extending outwardly from the anchor member stem and having a central opening through which the anchor member stem extends, the first auxiliary component further comprising a first auxiliary component secondary body extending from the first auxiliary component main body proximate to the outer periphery of the anchor member seal member;

the first auxiliary component main body and the first auxiliary component secondary body being formed as an integrated structure;

the anchor member being rigidly mounted to the first auxiliary component main body without the use of discrete retainers or fasteners;

a vent port extending through the anchor member;

the vent port having a first end disposed on the seal member second side in fluid communication with the controlled pressure zone and a second end disposed on the stem second end in fluid communication with an area of ambient pressure;

the vent port second end being within a stem landing zone on the stem second end;

the second auxiliary component being slidably mounted to the first auxiliary component to facilitate a first position and a second position of the second auxiliary component relative to the first auxiliary component, the second auxiliary component and the first auxiliary component being discrete components formed independently of each other;

the first position of the second auxiliary component comprising a vent port closure position wherein the second auxiliary component directly engages the stem landing zone and blocks the vent port to prevent the passage of air therethrough, such that the controlled pressure zone is rendered airtight and the base seal member will resist movement of the anchoring apparatus away from the surface when the base seal member is flexed in a manner that increases the volume of the controlled pressure zone and decreases the air pressure therein; and the second position of the second auxiliary component comprising a vent port open position wherein the second auxiliary component is disengaged from the stem landing zone and unblocks the vent port to allow the passage of air therethrough, such that the controlled pressure zone is vented to the area of ambient pressure and the base seal member will not resist movement of the anchoring apparatus away from the surface.

* * * * *